United States Patent
Bloomberg et al.

[11] Patent Number: 6,076,738
[45] Date of Patent: Jun. 20, 2000

[54] SELF-CLOCKING GLYPH SHAPE CODES

[75] Inventors: Dan S. Bloomberg; David L. Hecht; Robert F. Tow, all of Palo Alto; L. Prasadam Flores, Santa Cruz, all of Calif.

[73] Assignee: Xerox Corporation, Stamford, Conn.

[21] Appl. No.: 08/240,798

[22] Filed: May 10, 1994

Related U.S. Application Data

[63] Continuation of application No. 07/931,554, Aug. 18, 1992, abandoned, which is a continuation of application No. 07/560,514, Jul. 31, 1990, abandoned.

[51] Int. Cl.[7] .............................................. G06K 19/06
[52] U.S. Cl. .......................................... 235/494; 235/456
[58] Field of Search ................................. 235/456, 494; 382/9, 30, 40

[56] References Cited

U.S. PATENT DOCUMENTS

| | | | |
|---|---|---|---|
| 3,257,545 | 6/1966 | Van Berkel et al. | 235/494 |
| 3,654,435 | 4/1972 | Vaccaro | 235/494 |
| 3,898,434 | 8/1975 | Bigelow et al. | 235/494 |
| 3,978,319 | 8/1976 | Vinal | 235/466 |
| 4,115,806 | 9/1978 | Morton | 382/23 |
| 4,286,146 | 8/1981 | Uno et al. | 235/494 |
| 4,610,025 | 9/1986 | Blum et al. | 382/9 |
| 4,630,308 | 12/1986 | Hongo | 382/34 |
| 4,728,783 | 3/1988 | Brass et al. | 235/456 |
| 4,754,127 | 6/1988 | Brass et al. | 235/456 |
| 4,817,171 | 3/1989 | Stentiford | 382/34 |
| 4,905,296 | 2/1990 | Nishihara | 364/728.01 |
| 4,924,078 | 5/1990 | Sant'Anselmo | 235/494 |
| 4,980,923 | 12/1990 | Kawamoto et al. | 382/8 |
| 5,073,954 | 12/1991 | Van Tyne et al. | 235/494 |
| 5,091,966 | 2/1992 | Bloomberg et al. | 235/494 |

FOREIGN PATENT DOCUMENTS

| | | |
|---|---|---|
| 8600445 | 1/1986 | European Pat. Off. . |
| 2179008 | 2/1987 | European Pat. Off. . |
| 62-140554 | of 1987 | Japan . |

OTHER PUBLICATIONS

Mansour, M. Multi–Tiered Condensed Bar Code. IBM Technical Disclosure Bulletin, vol. 26, No. 2, Jul. 1983, pp. 766–767.

*Primary Examiner*—Harold I. Pitts

[57] ABSTRACT

This invention provides self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned-in to an electronic document processing system. Moreover, for at least some applications, the glyphs desirably are composed of printed pixel patterns containing nearly the same number of ON pixels and nearly the same number of OFF pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes also are diclosed, but this application focuses on the codes.

8 Claims, 16 Drawing Sheets

SELF-CLOCKING GLYPH SHAPE CODES

This is a continuation of application Ser. No. 07/931,554, filed Aug. 18, 1992 AB which, in turn, was a continuation of application Ser. No. 07/560,514, filed Jul. 31, 1990 AB.

FIELD OF THE INVENTION

This invention relates to self-clocking codes for recording digital data on hardcopy recording media and, more particularly, to codes composed of glyphs that have digital data values encoded in their shapes. Advantageously, the glyphs are selected so that they tend not to degrade into each other, but the broader aspects of this invention are directed toward codes composed of discriminable glyphs, without specific limitation to the amount of image degradation and/or distortion the codes can tolerate.

Even more specifically, this invention relates to codes of the foregoing type that have a generally uniform textured appearance when they are printed or otherwise rendered in hardcopy form. The texture of higher spatial density codes is difficult for the casual observer to discern, so those codes commonly are described as having a generally uniform gray appearance.

CROSS REFERENCE TO RELATED APPLICATIONS

Binary image processing and convolution filtering techniques for decoding self-clocking glyph shape codes are described herein, but those decoding processes are covered by concurrently filed and commonly assigned U.S. patent applications of Dan S. Bloomberg and Richard G. Stearns et al. Specifically, the Bloomberg application is on "Binary Image Processing for Decoding Self-Clocking Glyph Shape Codes," and the Stearns et al. application is on "Convolution Filtering for Decoding Self-Clocking Glyph Shape Codes." Furthermore, the adaptive scaling that may be utilized for scaling either or both of the above decoding processes to the decoding of a self-clocking glyph shape code of unknown spatial periodicity is covered by a concurrently filed and commonly assigned U.S. patent application of Bloomberg et al. on "Adaptive Scaling for Decoding Spatially Periodic Self-Clocking Glyph Shape Codes."

BACKGROUND OF THE INVENTION

Plain paper still is a favored recording medium for storing and transferring human readable information, but the emergence of electronic document processing systems has made it evident that the functional utility of plain paper and other types of hardcopy documents could be enhanced significantly if the human readable information they normally convey was supplemented by writing appropriate machine readable digital data on them. This machine readable data would enable the hardcopy document to actively interact with such a document processing system in a variety of different ways when the document is scanned into the system by an ordinary input scanner. See, for example, the copending and commonly assigned U.S. patent applications of Frank Zdybel, Jr. et al. and Walter A. L. Johnson et al., which were filed May 30, 1990 on "Hardcopy Lossless Data Storage and Communications for Electronic Document Processing Systems" (D/89190) and on "Form and System Utilizing Encoded Indications for Form Field Processing" (D/90003), respectively.

As a general rule, digital data is recorded by writing two dimensional marks on a recording medium in accordance with a pattern which encodes the data either by the presence or absence of marks at a sequence of spatial locations or by the presence or absence of mark related transitions at such locations. Ordinary magnetic and optical digital data recording conform to this style of encoding. Furthermore, the bar-like codes which have been proposed previously for recording digital data on paper also conform to the above-described encoding style. See U.S. Pat. No. 4,692,603 on "Optical Reader for Printed Bit-Encoded Data and Method of Reading Same," U.S. Pat. No. 4,728,783 and U.S. Pat. No. 4,754,127 on "Method and Apparatus for Transforming Digitally Encoded Data into Printed Data Strips," and U.S. Pat. No. 4,782,221 on "Printed Data Strip Including Bit-Encoded Information and Scanner Contrast.

Considering the aforementioned bar-like codes in some additional detail, it will be seen that their visual appearance is highly variable because it is data dependent, so they tend to have a mottled appearance. This mottling is a readily discernible departure from the clean, crisp appearance of high quality printed documents, so it may be aesthetically objectionable to some observers. Furthermore, another drawback of these bar-like codes is the overhead that they contemplate. In particular, as taught by the above-identified patents, this overhead includes the registration marks which are provided for preserving the data clock, as well as the header information which is provided for describing the organization of the encoded data, such as the number of bits encoded along a given line of code.

It, therefore, will be evident that there is an urgent need for relatively efficient, visually improved codes for recording digital data on plain paper and other types of hardcopy recording media, especially for applications in which such machine readable data is to be recorded in visual juxtaposition with human readable information. Furthermore, it will be appreciated that there is a need for efficient and reliable techniques for recovering digital data from such codes. Moreover, inasmuch as images carried by hardcopy documents often are replicated, such as by photocopying and by facsimile reproduction, it will be apparent that it would be very beneficial to have data encoding and decoding techniques that can tolerate a significant amount of image distortion.

SUMMARY OF THE INVENTION

In response to the foregoing and other needs, the present invention provides self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned-in to an electronic document processing system. Moreover, for at least some applications, the glyphs desirably are composed of printed pixel patterns containing nearly the same number of ON pixels and nearly the same number of OFF pixels, such that the code that is rendered by printing such glyphs on substantially uniformly spaced centers appears to have a generally uniform texture. In the case of codes printed at higher spatial densities, this texture is likely to be perceived as a generally uniform gray tone.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with specific reference to certain embodiments, it is to be understood that there is no intent to limit it to those embodiments. On the contrary, the aim is to cover all alternatives, modifications, and equivalents falling within the spirit and scope of the invention as defined by the appended claims.

A. An Examplary Environment

Figure 1:
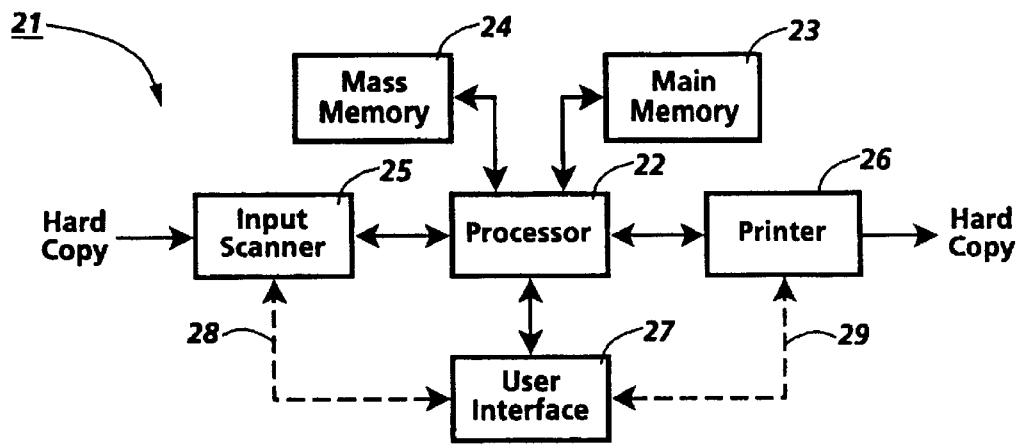
FIG. 1 is a simplified block diagram of an electronic document processing system for carrying out and taking advantage of the various aspects of the present invention.

Turning now to the drawings, and at this point especially to FIG. 1, there is an electronic document processing system 21 to illustrate a typical environment for this invention. In keeping with standard practices, the document processing system 21 comprises a digital processor 22 having a main memory 23 and a mass memory 24, an input scanner 25 for scanning digital representations of selected hardcopy documents into the processor 22, and a printer 26 for printing hardcopy renderings of selected ones of the files that are listed on the file directory (not shown) of the processor 22. Furthermore, there is a user interface 27 for enabling a user to interact with the processor 22, the input scanner 25, and the printer 26.

As will be understood, the user interface 27 collectively represents the input devices through which the user enters control instructions for the input scanner 25 and for the printer 26, as well as the image editing and manipulation instructions for the processor 22. Additionally, the interface 27 represents the output devices through which the user receives feedback with respect to the actions that are taken in response to the instructions that are entered by the user or otherwise, such as under program control. For example, the user interface 27 generally includes a keyboard or the like for entering user instructions, a monitor for giving the user a view of the process that is being performed by the processor 22, and a cursor controller for enabling the user to move a cursor for making selections from and/or for entering data into a process that is being displayed by the monitor (none of these conventional components is shown).

The illustrated document processing system 21 is centralized, so it has been simplified by assuming that all control instructions and all image editing and manipulation instructions are executed by the processor 22 under program control. In practice, however, the execution of these instructions may be handled by several different processors, some or all of which may have their own main memory and even their own mass memory. Likewise, either or both of the input scanner 25 and the printer 26 may have its own user interface, as indicated by the dashed lines 28 and 29, respectively. Indeed, it will be evident that the document processing system 21 could be reconfigured to have a distributed architecture to operate with a remote input scanner and/or a remote printer (not shown). Data could be transferred from and to such remote scanner and printer terminals via dedicated communication links or switched communication networks (also not shown).

Customarily, the input scanner 25 is a bitmap scanner which scans the image of each hardcopy input document at a predetermined spatial resolution of, say, 300 s.p.i.×300 s.p.i. (spots/inch). In operation, the scanner 25 converts the individually resolved picture elements (commonly called "pixels" or "pels") of the scanned image into corresponding digital values and assembles those digital values to produce a data structure (known as a "bitmap image") which preserves the spatial relationship of the pixels to which the scanned-in values pertain. Although the following description focuses on applications in which the scanner 25 is a black-and-white scanner for converting the pixels of the scanned-in image into single bit digital values (i.e., "1" or "0"), it will be understood that it could be a gray-scale scanner for converting the pixels into multi-bit values. Furthermore, it will be evident that the scanner 25 could capture a bitmap image of a document or the like through the use of a video pick-up device and a so-called video "frame grabber", together with appropriate thresholding logic if needed.

Figure 2:
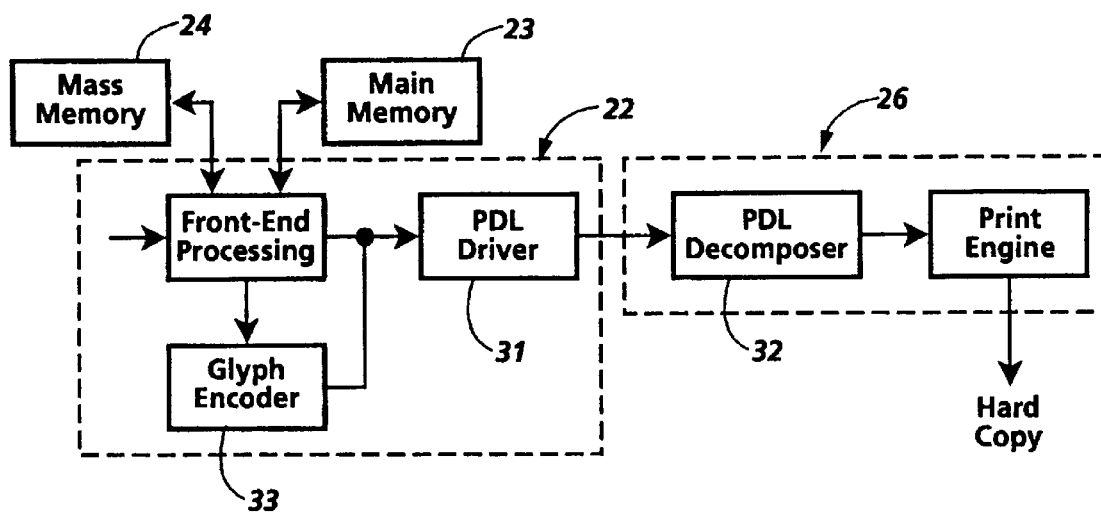
FIG. 2 is a functional block diagram of a typical processor/printer interface for the document processing system shown in FIG. 1.

The printer 26, on the other hand, generally is a so-called bitmap printer for mapping the digital values of a bitmapped image file into the spatially corresponding pixels of the image it prints on a suitable recording medium, such as plain paper. The processor 22 may be configured to manipulate and store bitmapped image files and to transfer such files on demand to the printer 26. Alternatively, however, as shown in FIG. 2, the processor 22 may include a PDL (page description language) driver 31 for transferring to the printer 26 PDL descriptions of the electronic document files that are selected for printing. Thus, the printer 26 is illustrated as having a PDL decomposer 32 for decomposing such PDL descriptions to produce corresponding bitmapped image file. Still other types of printers and processor/printer interfaces will suggest themselves, but it will be assumed for purposes of the following discussion that the printer 26 is a bitmap printer that receives PDL files from the processor 22.

B. Glyph Shape Encoding

To carry out this invention, there is a glyph encoder 33 for causing the printer 26 to print machine readable digital data glyphs on the recording medium, either alone or in juxtaposition with human readable information. For certain applications the glyph encoder 33 may be co-located with the processor 22 for inserting glyph encodings into the electronic document files prior to the translation of such files into PDL descriptions. But, for other applications, it may be necessary or desirable to have the glyph encoder 33 insert the glyph encodings into the raster formatted bitmapped image file that is provided for the printer 26. PDL descriptions of glyph shape encoded data may take several different forms, including encapsulated bitmap representations of the code in which such data is encoded, font descriptions and layout locations for bitmap representations of the individual encoded glyph shapes (assuming that such bitmaps exist on or are down loadable to the font directory of the printer 26), and bit-by-bit descriptions of the bitmaps for the encoded glyph shapes.

Figure 3:
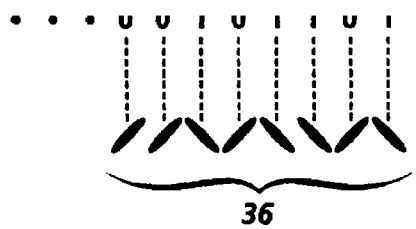
FIG. 3 is a coding diagram for illustrating the bit encoding that is provided by a relatively simple self-clocking binary glyph shape code composed of rotationally variant glyph shapes.
Figure 3A:
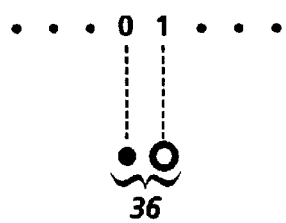
FIG. 3A is another coding diagram for illustrating the bit encoding of binary data in a rotationally invariant glyph shape code.
Figure 3B:
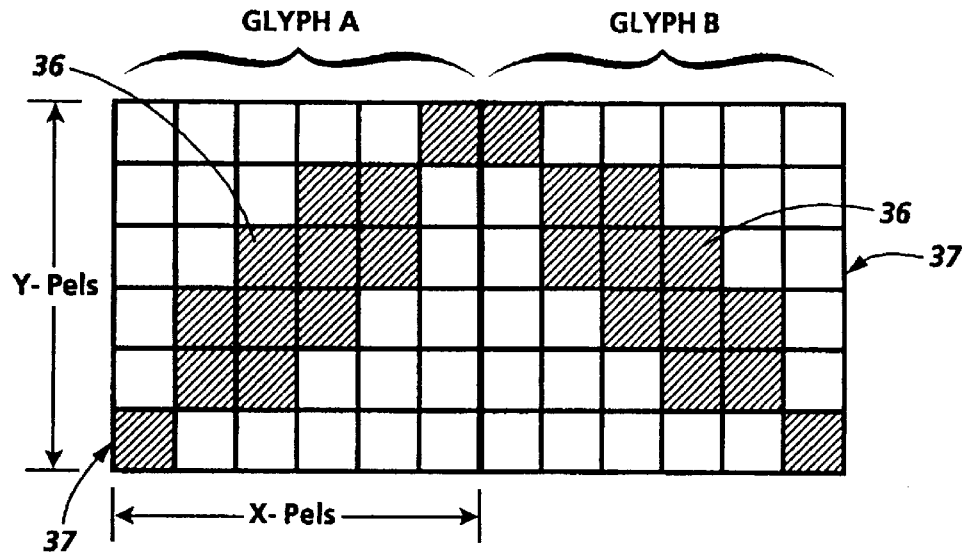
FIG. 3B depicts typical data cell structures, as well as typical printed pixel patterns for rotationally variant glyph shapes of the type shown in FIG. 3.

More particularly, in accordance with the present invention as shown in FIGS. 2 and 3, the digital data 35 that is applied to the encoder 33 is encoded in the shapes of the glyphs 36 which the encoder 33 causes the printer 26 to print on the recording medium. These glyphs form a self-clocking glyph code because the code that is printed on the recording medium has a separate glyph 36 for each of the encoded data values. In practice, as shown in FIG. 3B, each of the printed glyphs 36 is defined by the pixel pattern that is printed within a generally rectangular, two dimensional, array 37 of pixel positions (referred to hereinafter as a "glyph cell" or as a "data cell"). See FIG. 3B for an example. These glyph defining data cells 37 typically are tiled onto the recording medium in accordance with a predetermined spatial formatting rule which causes the glyph encodings 36 for successive data values to be spatially distributed in accordance with a predefined template or pattern. For instance, the data cells 37 containing the glyph encodings 36 for successive data values suitably are printed on the recording medium in accordance with a regular and repeating logical data block formatting rule, such that the printed data cells are spatially organized in a two dimensional array of logical blocks of predetermined size, such as a 16 cell×16 cell logical block format.

Glyph shape encoding clearly permits of many different implementations, some of which are suitable for the encoding of single bit digital values and others of which are suitable for the encoding of multi-bit values. For example, single bit values ("1" and "0") conveniently are encoded by printing elongated, multi-pixel glyphs, each of which is composed of a predetermined number of adjacent "ON" (say, black) pixels which align along an axis that is inclined at an angle of about +45° or −45° from the transverse axis of the recording medium depending on whether the data value encoded therein is a "1" or a "0." Such glyphs are examples of so-called "rotationally variant" glyphs because they can be mapped onto each other merely by rotational operations. They also are examples of glyphs which are readily discriminable, even in the presence of significant distortion and image degradation, because they do not tend to degrade into a common shape.

An important advantage of selecting the glyphs 36 so that they all have the same number of "ON" pixels is that the printed glyph code will have a generally uniform texture, which will take the form of a gray scale appearance when higher density glyphs are viewed by a casual observer. It, therefore, is worth noting that this advantage may be realized by encoding the data in the rotation and/or the contour (collectively referred to herein as the "shape") of the glyphs 36. For instance, single bit digital values may be encoded by rotationally invariant glyphs which have distinctly different contours, but the same number of "ON" pixels for the encoding of the "1's" and "0's", respectively. See FIG. 3A for an example. The gray tone appearance of the printed glyph code can be "tuned" to an aesthetically pleasing gray tone by increasing or decreasing the ON pixel content of the glyphs. Furthermore, the gray tone appearance of the printed glyph code could be modulated (by means not shown) in accordance with, say, gray scale pictorial values, thereby imparting a gray scale pictorial quality to the printed code.

While glyph shape encoding can be extended in theory to the encoding of digital values of any given bit length, n, simply by utilizing a code having $2^n$ permissible glyph shapes, the code should be selected with care to ensure that its glyph shapes can be discriminated from each other reliably because such discrimination is essential for accurately recovering the data that is encoded therein.

C. Decoding of Glyph Shape Codes

1. Overview

Figure 4:
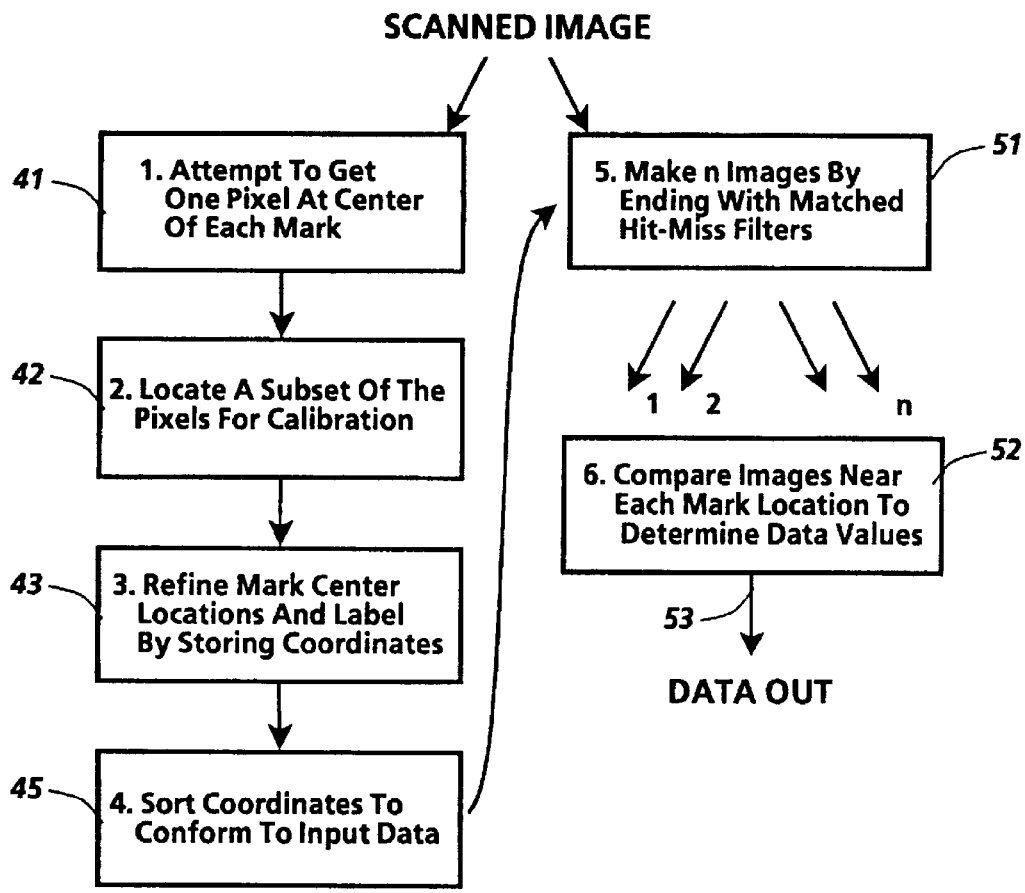
FIG. 4 is high level functional flow diagram of a first glyph code decoding process.

Turning now to FIG. 4, printed glyph codes of the foregoing type are susceptible to being decoded by processing bitmap images of them. As will be seen that the image processing techniques that are provided for decoding such glyph codes can tolerate a significant amount of image distortion and degradation, so codes carried by scanned-in photocopies and facsimile copies can be decoded, provided that the scanned-in document is not too many generations removed from the original. Of course, printed glyph codes can be regenerated by employing a suitable electronic document processing system for decoding the code to recover the encoded data and by then reprinting the code with that very same data encoded therein, with both the decoding and re-encoding being performed essentially as described herein.

In certain decoders, the image processing which is performed for decoding the glyph codes first locates the glyphs in the X-Y coordinates of the bitmap image space, then constructs a table for indexing the glyphs in the spatial order in which data was encoded in them, and then analyzes the glyphs in indexed order for sequentially extracting the data values that are encoded in them. In other decoders, the image processing classifies the glyphs by their shapes while concurrently locating their centers in the bitmap image space, so the decoded values of the glyphs conveniently are indexed to the bitmap image space. However, these spatially indexed decoded data values may be sorted in accordance with the spatial template or pattern that governs their spatial ordering if it is desired to restore their serial order in the time domain.

2. Decoding By Binary Image Processing a. Introduction

In the decoding process illustrated by FIG. 4, the bitmap image of the glyph code is first processed morphologically and/or through the use of a pixel search technique to isolate the approximate or apparent centers of the glyphs, as at 41. Predetermined ones of these apparent glyph centers, such as the apparent centers of the corner glyphs, then are employed as reference points for computing at 42 appropriate skew and X and Y scaling correction factors to compensate for the skew errors and the X and Y scaling errors, respectively, which may have been introduced into the glyph code while it was being copied and/or scanned-in. As will be seen, these compensating factors are employed for computing vectors that enable a glyph center labelling process to jump from glyph center-to-glyph center (or, more precisely, to a likely location of the next glyph center). Thus, a relatively localized pixel search process is sufficient for labelling the apparent center pixel of each glyph with its X-Y image space coordinates, as at 43. Spurious image noise effectively is rejected at this point because no labels are provided for the noise components of the image.

As will be recalled, data typically is encoded into the glyphs in logical block-by-block, cell-by-cell order. For that reason, as indicated at 45, the X-Y coordinate labels for the glyphs typically are sorted in accordance with the spatial order of the data encoding, thereby constructing an index table for serially addressing the glyphs in the same order as the data was encoded into them. Or, if desired, a pointer (not shown) may be provided for randomly accessing the glyphs at one or more preselected locations within the bitmap image space, such that index is constructed at 45 for decoding selected ones of the glyphs in the order in which they are accessed. For example, a straightforward X-Y seek may be employed for relatively rapidly shifting such a pointer from the center of any one glyph to the center of any other glyph in the bitmap image space by computing the direction and the number of glyph centers in and by which, respectively the X and the Y coordinates of any two given glyph centers are displaced from each other in the bitmap image space. Given that directional information and those intermediate glyph center counts, an appropriate seek may be executed by first incrementally shifting the pointer from glyph center-to-glyph center in the indicated direction along, say, the X-axis, until the pointer has skipped across the given number of intermediate glyph centers, and by then repeating the above process to incrementally shift the pointer to its intended destination along the other or Y-axis.

For recovering the encoded data values from the glyph code, $2^n$ copies of the bitmap image of the code (where n is the bit length of the data value encoded in each of the glyph shapes) are each filtered, as at 51, by a filter that is matched to a respective one of the $2^n$ permissible glyph shapes. For example, each of these images can be morphologically processed in accordance with a hit-miss filter that is weakly matched to a respective one (and only one) of the permissible glyph shapes. This yields $2^n$ differently filtered versions of the bitmap image. Specifically, as a result of the hit-miss filtering, the pixel pattern proximate to any given glyph center or "data label" location in any given one of the filtered images is dependent upon the precision of the match between the hit-miss filter used to prepare the given image and the glyph residing at the given data label location (i.e., the closer the match, the greater the number of "ON" pixels proximate the e data label location). Therefore, the pixel patterns of the filtered images are compared, as at 52, data label location-by-data label location in logical encoding order (or random access order), to determine and sequentially read out, as at 53, the data values encoded in successive ones of the glyphs.

b. Definitions

Prior to considering the decoding process in further detail, it may be helpful to briefly define some of the terms that have been adopted for describing "morphological image processing operations":

"Morphological operation" is an operation on a bitmap image (called the "source image") that uses a local rule at each pixel location with the source image to create another bitmap image (known as the "destination image). For convenience, the source and destination images sometimes are referred to as "pixelmap" images so that the operational rate can be viewed as operating on each "pixel". "Bitmap" and "pixelmap" are synonymous terms for a data structure of a certain type, and "bit" and "pixel" are used interchangeably herein to describe the contents of such a data structure.

"Structuring Element (SE) is an image object, typically of relatively small size and simple shape, for probing the source image to extract information from it through the use of a selected morphological operations. The SE's referred to herein below are binary SE's. They are illustrated by using solid circles to identify their "ON" pixels and hollow circles to identify their "OFF" pixels. Their centers are identified by a video cross. SE's also may include "Don't Care" pixels, so it is noted that such pixels are represented by empty squares The following terms are specific to binary morphological operations:

"EROSION" is an operation that is performed by probing a binary source image with a SE to write an "on" (1) or an "off" (0) pixel into the destination image for each pixel location within the source image, with the logic level of the pixel that is written at any given location depending upon whether the SE is matched or not by the source image when it is centered on the given pixel location. When the SE to be matched contains both "hits" and "misses," the matching operation commonly is called a "hit-miss transform." However, to simplify this disclosure, the definition of EROSION has been expanded to include such hit-miss transforms.

"DILATION" is an operation that is performed by probing a binary source image with a SE to write the SE into the destination image on centers corresponding to the locations of all "ON" pixels in the source image. As used herein, the DILATION is defined only for "hits" in the SE, so "misses" are ignored. Thus, the dilated destination image is the union of all replicas of the SE translated to all 1-pixels of the source image.

"OPENING" is an operation for replicating a SE in the destination image for each match to the SE in the source image. It is equivalent to an EROSION of a source image by an SE followed by a DILATION of the eroded image by the same SE. In keeping with the foregoing definitions of EROSION and DILATION, the definition of the OPENING operation has been expanded to include an EROSION with an SE containing both "hits" and "misses" followed by a DILATION with only the "hits" in the SE.

"CLOSING" is an operation composed of a DILATION of a source image followed by an EROSION of the dilated image. A CLOSING of an image is equivalent to a bit inversion of an OPENING that is performed on a bit inverted source image. In view of the foregoing definition of DILATION, it will be understood that a CLOSING is defined herein only for "hits" in the SE, so any "misses" are ignored.

Morphological operations are translationally invariant. In other words, a source image may be translated prior to be transformed, thereby causing the result to be translated or shifted by the same amount, without otherwise changing it. This means that these operations may be implemented with a high degree of parallelism because each bit or pixel in the source image is processed in accordance with the same rule.

EROSION, DILATION, OPENING and CLOSING operations performed with SE's consisting only of "hits" are geometrically "increasing" operations. Therefore, if a first image is contained in a second image, any of these operations that are performed with such a SE on the first image will also be contained in the second image. Furthermore, CLOSING is "extensive", and OPENING is "antiextensive". Accordingly, the source image is contained in the destination image when the source is transformed by a CLOSING, and the destination image is contained in the source image when the source is transformed by an OPENING. The results of OPENING and CLOSING operations are independent of the position of the center of the SE. Moreover, OPENING and CLOSING operations are indempotent, which means they will not change the transformed image if they are reapplied to it.

Other terms that are sometimes used in describing morphological operations are:

a "4-connected region" is a set of ON ("1")pixels, such that a path between any two of those pixels can be found that stays entirely within the set of ON pixels and consists of only horizontal or vertical 1-pixel moves.

a "8-connected region" is a set of ON ("1")pixels, such that a path between any two of those pixels can be found that stays entirely within the set of ON pixels and consists of only horizontal, vertical or diagonal 1-pixel moves.

A "hit-miss" SE is an SE that specifies a non-zero set of ON pixels and a non-zero set of OFF ("0") pixels, with those two sets being non-overlapping (i. e., non-intersecting). A "weakly" matched filter specifies relatively few pixels of the pixel pattern to which it is matched, while a "strongly" matched filter specifies a large percentage of the pixel pattern to which it is matched.

A "hit-only" SE is an SE that specifies a non-zero set of ON pixels.

c. A Detailed Implementation

Figure 5:
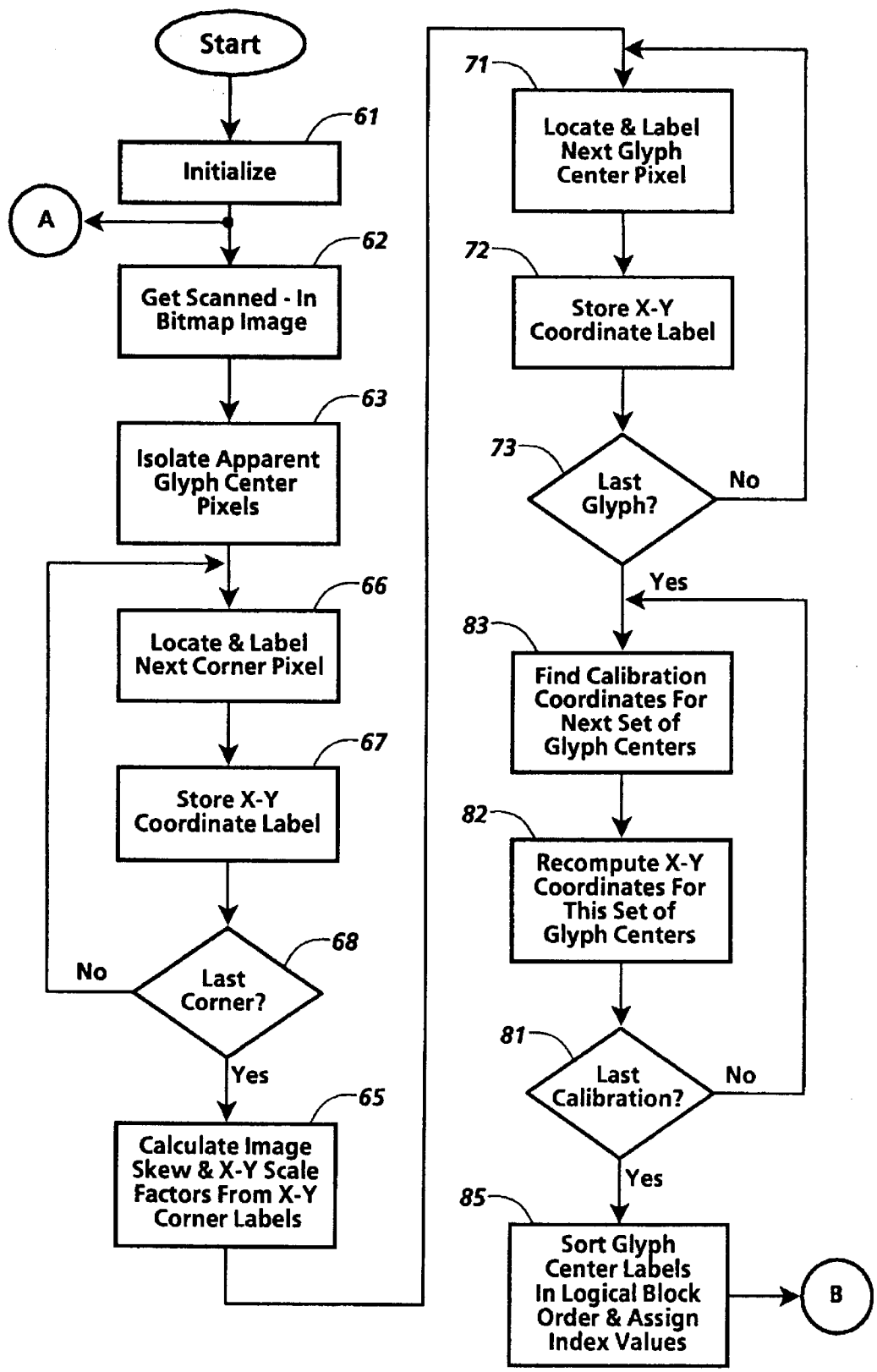
FIG. 5 is a more detailed flow diagram of the glyph center locate, label and sort phase of an implementation of decoding process shown in FIG. 4.

Referring now to FIG. 5, in keeping with generally accepted practices, the processor and main memory resources which are utilized to execute the glyph decoding program are re-initialized, as at 61, each time the decoding program is invoked. In the embodiment illustrated in FIG. 1, the processor 22 communicates with its main memory 23 and, if necessary, its mass memory 24 (FIG. 1) to carry out the glyph decoding process, but it will be evident that the decoding process could be performed under the control of a separate programmed processor (not shown) through the use of the main memory 23 or through the use of a separate memory system (not shown).

i. Clock Recovery

Once the system has been initialized to decode a given glyph code, a copy of the bitmap image of the code is loaded into main memory, as at 62, and this image then is transformed, as at 63, to provide an identically scaled bitmap image composed of at least one centrally located bit or "pixel," but no more than a few, for each of the glyphs of the code. As described hereinbelow, the process for performing the transformation 63 typically is tailored to the spatial density at which the glyphs are printed because high density glyphs are more likely to be inseparably merged by the blurring that occurs during printing, copying and scanning than lower density glyphs. If the scanned-in glyphs are well separated, they may be shrunk to a single pixel near their respective centers. If, on the other hand, the scanned-in glyphs are touching, they may first be isolated from each other by filtering and then shrunk. For the moment it will be assumed that the transformation 63 transforms the scanned-in bitmap of the glyph code to a bitmap containing a single pixel at the approximate center of each data cell of the code, but it is to be understood that this is not essential.

ii. Determining Skew and Scale

In practice, the scanned-in image of the glyph code which is to be decoded may be skewed from the horizontal in a clockwise or counterclockwise direction, and may be distorted by scaling errors of different magnitude along its X-axis and/or its Y-axis. For that reason, provision is made at 65 for computing skew and scale correction factors to correct for such errors on a glyph-by-glyph basis (as shown) or on a data block-by-data block basis not shown or through the use of an image deskewing and rescaling process (also not shown).

As will be evident, skew and scale correction factors can be computed from the X-Y coordinates, in the scanned-in bitmap image space, of any three or more non-colinear reference points that have a nominal (i.e., error-free) spatial relationship which is known or capable of being determined. One of these reference points is selected to define a translationally invariant reference position, so that the skew and the scaling errors can be determined by comparing the distance and angle at which the actual and nominal positions of each of the other reference points are displaced from that spatially fixed reference position.

A previously pointed out, the data encoded glyphs typically are printed at a predetermined spatial density in generally square data arrays or blocks, so the centers of the glyph defining data cells (commonly referred to herein as the glyph centers) usually are arranged in a generally rectangular configuration. Therefore, the skew and scale correction factors suitably are computed from the X-Y bitmap image space coordinates of the apparent center pixels of at least three of the corner glyphs of the printed glyph code (although, it will be apparent from the foregoing description of the characteristics required of the so-called "reference points" that the apparent centers of any other uniquely identifiable glyphs could be employed in lieu of or in addition to the apparent centers of the corner glyphs). Thus, as illustrated, the X-Y coordinates of one after another of the selected corner pixels are identified at 66 and stored at 67, until it is determined at 68 that all of the information that is needed to compute the skew and scale correction factors at 65 has been collected.

Again, however, is to be understood that the apparent centers of any other uniquely identifiable glyphs could be employed, in lieu of or in addition to the apparent centers of the corner glyphs, for computing such skew and scale correction factors, so reference is made to the foregoing description of the characteristics required of the so-called "reference points." Moreover, it is to be understood that the center pixels of the corner glyphs may be used for computing the skew and scale correction factors for other types of glyph code patterns, such as hexagonal lattice patterns.

Relatively straightforward image analysis can be performed on the transformed bitmap that is provided by the transformation step 63 for identifying the X-Y coordinates of the corner pixels with sufficient precision to compute appropriate skew and scale correction factors. If the bitmap image of the apparent glyph center pixels is scanned in left-to-right and top-to-bottom order, starting slightly above the bitmap image, the first ON pixel that is encountered may be either the upper left-hand (UL) corner pixel or a pixel at or near the upper right-hand (UR) corner of the image. To resolve this ambiguity, this pixel is tentatively accepted as being the UL corner pixel, but it is subject to being deaccepted in favor of applying the UL corner pixel designation to any subsequently scanned pixel which is more than M pixels to the left and no more than N scan lines below the tentatively accepted pixel.

In some situations, the UL corner glyph may be missing, so the pixel representing the approximate center of the second glyph in the first line of the glyph code may be tentatively identified as being the UL corner pixel. If, however, N is chosen to be slightly greater (in scan lines) than the average center-to-center vertical spacing of the glyph or data cells, this error can be detected and corrected by imputing a UL corner pixel location to the bitmap image if an ON pixel is encountered anytime during the scanning of the N scan lines at a distance of roughly one data call to the left of the tentatively accepted pixel. In other situations, the pixel marking the approximate center of the first glyph in the second row of data may be slightly to the left of the UL corner pixel. If, however, M is selected to be a suitably large fraction (say, about one-half) of the average horizontal center-to-center horizontal displacement (in printer pixels or pels) of the data cells, this anomaly generally will be ignored if the bitmap image is skewed by no more than 20° or so. In short, the preferred values for M and N depend on the data cell size in pels of the printed glyphs. For a 10 pel×10 pel data cell size, M suitably is selected to be about 5 pixels and N suitably is selected to be about 15 scan lines. By way of comparison, for a 5 pel×5 pel cell size, M typically is selected to be about 3 pixels and N typically is selected to be about 8 scan lines.

The above-described process for locating the UL corner of a scanned-in glyph code pattern is extensible by straightforward analogy to provide corresponding processes for locating the apparent center pixels of the upper right-hand (UR) corner, the lower left-hand (LL) corner, and the lower right-hand (LR) corner glyphs of the scanned-in code pattern. The X-Y coordinates of these corner pixels can be identified in the bitmap image space by assigning (0,0) reference coordinates to, say, the pixel at the UL corner and by then referencing the coordinates of all of the other corner pixels to those reference coordinates.

Alternatively, the apparent center pixel of any or all of the corner glyphs can be found by performing one or more scans along a scan line that is sloped upwardly to the right for the UL and LR corner and upwardly to the left for the UR and LL. This scan line is initially positioned a safe distance outside the glyph code pattern, but it is incrementally shifted in toward the targeted corner glyph for each successive scan to progressively close in on it. Therefore, the apparent center pixel of the targeted corner glyph ordinarily is the first "ON" pixel that this scan process encounters.

Given the data cell size (in printer pels) of the printed glyphs and the X-Y bitmap image space coordinates of the apparent center pixels of the printed glyph code pattern, the rotation and scaling of the bitmap image of the glyph code can be determined as described above. Alternatively, the periodicity of the glyphs can be determined by performing a frequency transform, such as a Fourier transform or a Walsh transform, on either the scanned-in bitmap of the glyph code or on the bitmap of the glyph center pixels.

iii. Jump, Search, and Label

Thus, it will be evident that the average number of pixels between the centers of adjacent glyphs in the bitmap image of the glyph code also can be computed, as at 80. Given that information, a jump and search process can be initiated at, say, the UL corner pixel of the bitmap image of the apparent glyph centers to serially identify, as at 71, and store, as at 72, approximate X-Y bitmap image space coordinates for the apparent centers of one after another of the spatially adjacent glyphs from one after another of the spatially adjacent rows of the printed glyph code. This coordinate labeling process starts with a jump from the UL corner pixel to the expected location of the center of its right-hand neighbor. If an ON pixel is found at that location, the pixel is labeled with its X-Y coordinates, and the process then jumps to the expected center location of the next neighboring glyph. If, on the other hand, the process fails to find an ON pixel at the expected center location, it carries out an expanding search, typically using an expanding diamond-like or spiral-like search pattern, to determine whether there is an ON pixel within a few pixel positions in one direction or another of the expected center location. If so, the process labels the first "ON" pixel it encounters with its X-Y coordinates, and then jumps to the likely center location of the next neighboring glyph. Conversely, if the search fails to find a nearby ON pixel, the process suitably returns to the location at which it expected to find the center pixel for the glyph to label that location with its X-Y coordinates before jumping ahead to locate the center pixel of the next glyph. This process continues glyph-by-glyph and row-by-row of the scanned-in glyph code to provide a X-Y coordinate label in the bitmap image space for each and every glyph center location.

iv. Recalibrated Glyph Center Labeling (Optional)

Figure 6:
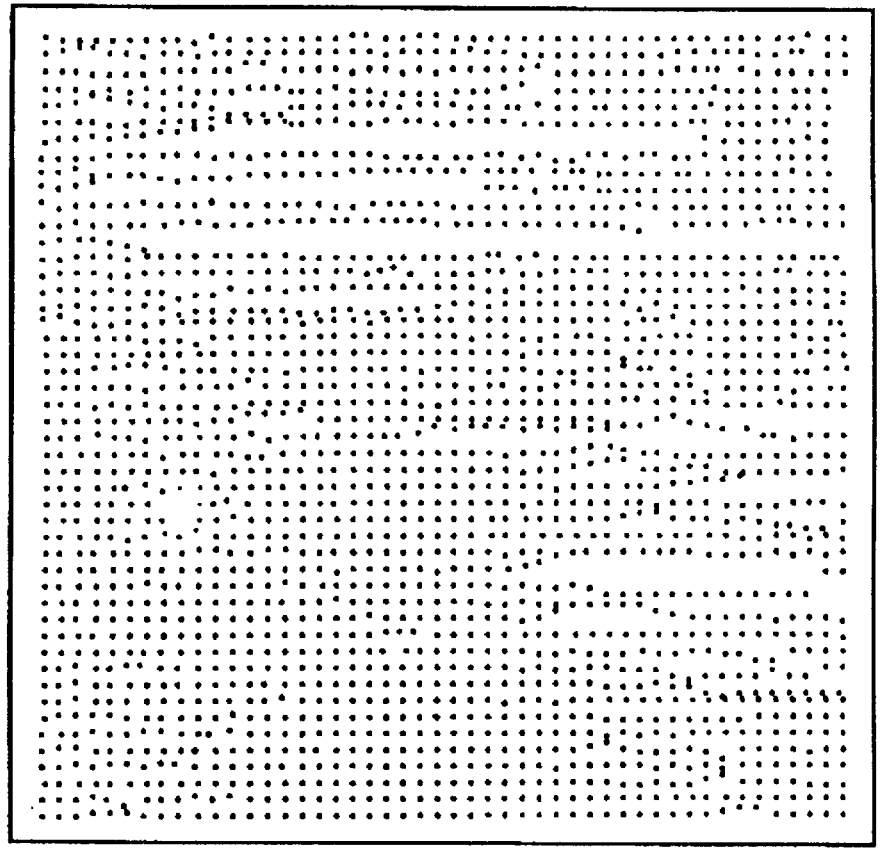
FIG. 6 is a bitmap image of labelled glyph center locations that are candidates for recalibration by the optional calibration process shown in FIG. 5.

As shown in FIG. 6, the glyph center labeling that is performed by the above-described jump and search process may contain errors if the glyph centers are not well separated in the glyph center bitmap image. Some of the transformation processes that may be employed for producing a glyph center bitmap image from a scanned-in bitmap image of a high density glyph code do not guarantee that such a separation will exist for all glyph centers, so there is an optional calibration process for recomputing the X-Y coordinate labels for the glyph centers of such images.

Returning to FIG. 5, it will be seen that this optional calibration process uses the X-Y coordinates for the center of gravity of one or more sets of glyph center pixels for recomputing the X-Y coordinates for all of the glyph center pixels within each of those sets based on the average distance of those pixels from the center of gravity of the given set. This calibration may be performed once to calibrate the X-Y coordinates of the glyph center pixels relative to the center of gravity of the glyph center bitmap image. Or, as shown, it may be repeated, as at 81, for calibrating the X-Y coordinates of successive sets (e.g., 16×16 blocks) of glyph center pixels, as at 82, with respect to their respective centers of gravity, as determined at 83.

v. Restoring Encoded Data Values to the Time Domain

After the X-Y coordinate labels have been applied to the glyph center pixels and all necessary calibrations of them have been completed, the X-Y coordinate labels ordinarily are sorted into a logical block sequence, thereby serially re-ordering them in accordance with the order in which data is encoded into the glyphs labeled by them. Moreover, as indicated at 85, incrementally increasing index values are assigned to the re-ordered labels so that they can be retrieved easily in sorted sequence.

vi. Determining Data Values from Glyph Shapes

Figure 7:
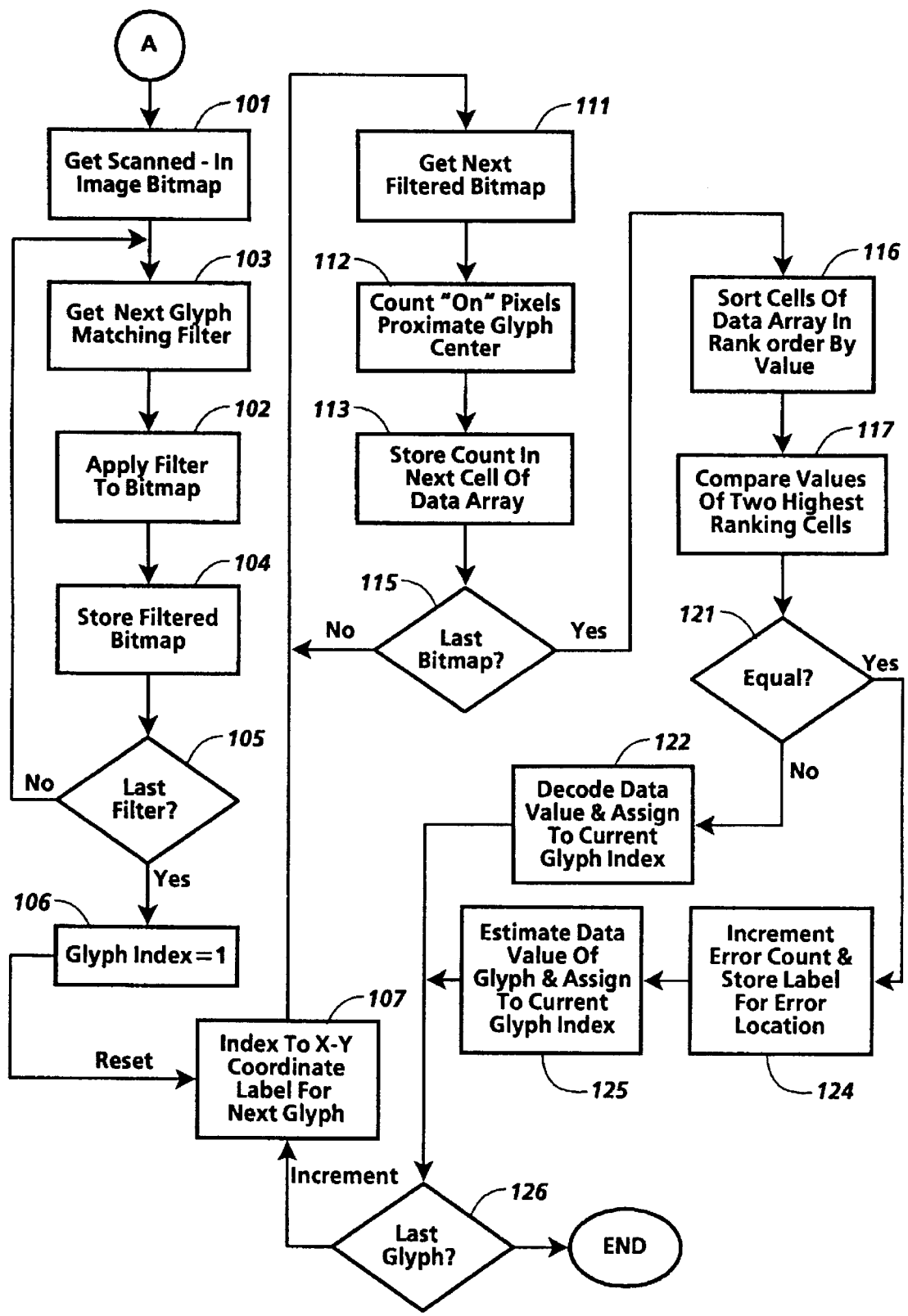
FIG. 7 is a relatively detailed flow diagram of the glyph read/error detect phase of the aforementioned implementation of the decoding process shown in FIG. 4.

Turning to FIG. 7, given the indexed X-Y coordinate labels for the glyphs, the glyph code can be decoded by analyzing the shapes of the individual glyphs in logical sequence to serially determine the data values that have been encoded in them. To perform this glyph shape analysis, the scanned-in bitmap image of the glyph code, as at 101, is separately filtered at 102 in accordance with a plurality of different filters, as at 103, each of which is selected to pass pixels from a respective one of the permissible glyph shapes and to suppress pixels from all of the other glyph shapes. For that reason, the filters may be described as being individually "tuned" to respective ones of the permissible glyph shapes. The bitmap filtering may be performed in series as shown in FIG. 7 or in parallel as indicated in FIG. 4. In any event, the filtered bitmaps are stored at 104, so that they can be retrieved during the glyph-by-glyph analysis phase of the decoding process as described below.

To provide the filtered bitmap images, the bitmap image of the glyph code advantageously is morphologically ERODED, through the use of independent operations, in accordance with a plurality of different weak hit-miss filters, each of which is relatively well matched to a different one of the permissible glyph shapes and relatively poorly matched to all of the others. These filters are referred to as "weak" hit-miss filters because they only loosely specify the shapes of the glyphs (i.e., the patterns of "ON" and "OFF" pixels that define the glyph shapes). Consequently, the filtering of a matching glyph within the source image typically causes several ON pixels to be written into the target or filtered image near the center of the matching glyph, while the filtering of a non-matching glyph results in significantly fewer, if any, ON pixels being written into the targeted image near the center of the non-matching glyph In other words, the filtering causes a significantly larger number of ON pixels to be written into a filtered image for the glyphs that are well matched by the filter that is used to produce that particular image than for the glyphs that are unmatched or only poorly matched by that filter.

After it is determined at 105 that all of the filtered bitmap images have been constructed, a glyph index pointer 107 is set, as at 106, to the index value for the first glyph that is to be decoded, thereby retrieving the X-Y image space coordinate label for the first glyph from memory. This label is used at 111 for spatially addressing one after another of the filtered bitmap images at approximately the center of the glyph that is to be decoded, so that the ON pixels that each of those images contains proximate the center of that particular glyph can be counted as at 112. These counts, in turn, are stored in separate cells of a data array, as at 113.

Figure 8:
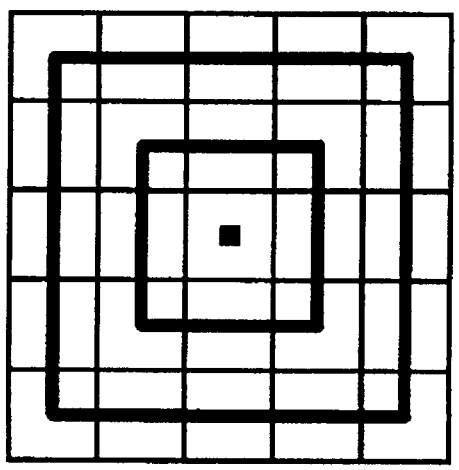
FIGS. 8 and 9 illustrate pixel search regions that are suited for use in decoding relatively low and relatively high density glyph codes, respectively.
Figure 9:
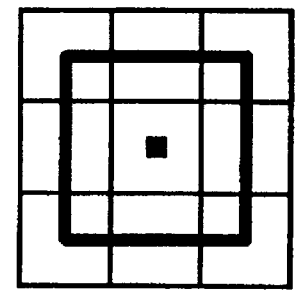

Typically, the pixel counting is performed by starting at the labeled center point of the addressed glyph and by then moving outwardly from there to count the number of ON pixels falling within a selected number of progressively larger squares centered on the glyph center point. This "square ring" search pattern expands in all directions at a rate of one pixel position/ring, but the search is confined to the data cell for the glyph that is being decoded. For example, as shown in FIG. 8 a three ring search is appropriate for glyph codes written at a density of 900 bits/in$^2$ using 10 pel×10 pel data cells for the glyphs. In contrast, as shown in FIG. 9, a two ring search is preferred for glyph codes written at a density of 3600 bits/in$^2$ using 5 pel×5 pel data cells. In both cases, the innermost ring is the X-Y labeled center point of the glyph.

Upon confirming at 115 (FIG. 7) that all of the pixel counts for the given glyph have been accumulated, the data array containing them is sorted at 116 in rank order by count value, so that the two largest counts can be extracted from it straightforwardly for comparison, as at 117. If these counts are unequal, as determined at 121, the data value associated with the glyph shape yielding the largest count is assigned to the index for the given glyph, as at 121. If, on the other hand, the equality test 121 determines that the two largest counts are equal, an error count is incremented to track the number of decoding ambiguities that occur and the X-Y coordinate label of the ambiguous glyph is stored to indicate where the ambiguity or "error" occurred. Thereafter, an estimate of the data value that was encoded in the ambiguous glyph is assigned to its index, as at 125. Then, if it is determined at 126 that there are more glyphs to be decoded, the glyph index value is incremented at 107 to repeat the count and compare process for the next glyph.

vii. Systems Utilizing Error Correction Encoding

Figure 10:
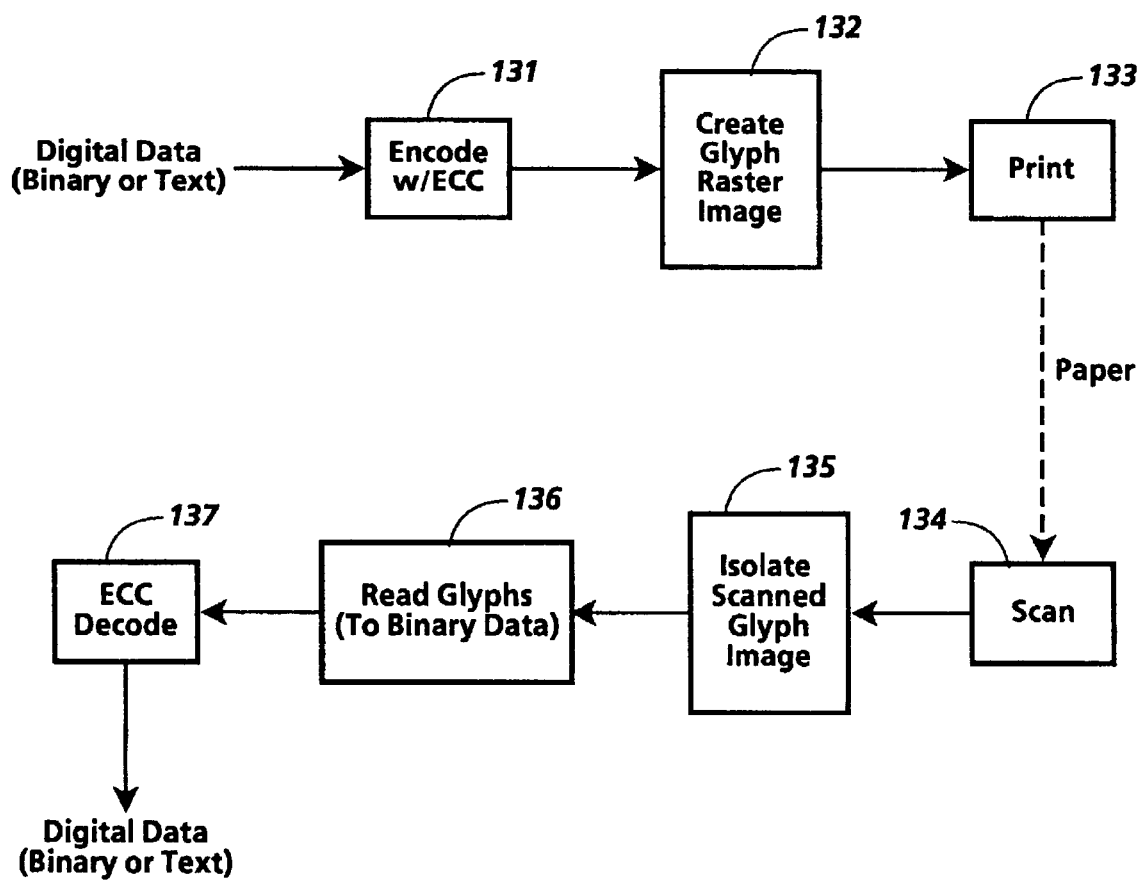
FIG. 10 is a high level functional block diagram of system wherein glyph shape encoding and decoding is used for data containing error correction codes (ECC)

As shown in FIG. 10, glyph shape encoding and decoding may be employed for data containing error correction codes. To that end, the data is glyph shape encoded at 131, and the encoded glyph shapes then are converted into a raster format at 132 so that they can be printed at 133 on a suitable recording medium, such as plain paper, by a bitmap printer. Subsequently, the printed image (which may include human readable information, as well as the glyph code) is converted into a bitmap image by an input scanning operation 134. This bitmap image is parsed at 135 to isolate the scanned-in image of the glyph code, so that the above-described decoding process can be employed at 136 to assign decoded data values to the glyph or data indices. The glyph decoded data is then processed at 137 by an error correction code decoder to provide the original data in error corrected form.

viii. Transforms for Isolating Glyph Center Pixels

Returning to the problem of identifying the centers of the glyphs in a glyph shape code, three different techniques will be described for performing that function. Two methods for transforming the scanned-in bitmap image of the glyph code into a bitmap of the glyph center pixels, as at 63 in FIG. 5, will be described in this section, and a third method that does not require such a transformation will be described in the following section. Therefore, in this section, it will be assumed that the transformation process 63 is carried out to isolate the glyph centers as a separate and distinct step from the evaluation of the glyphs. As will be seen, the transformation process 63 may be performed through the use of large filters representing the periodicity of the glyph code (these filters typically are on the order of 2–6 cycles long) or through the use of small filters representing individual glyph shapes (these filters usually are somewhat smaller than the glyphs)

Figure 11:
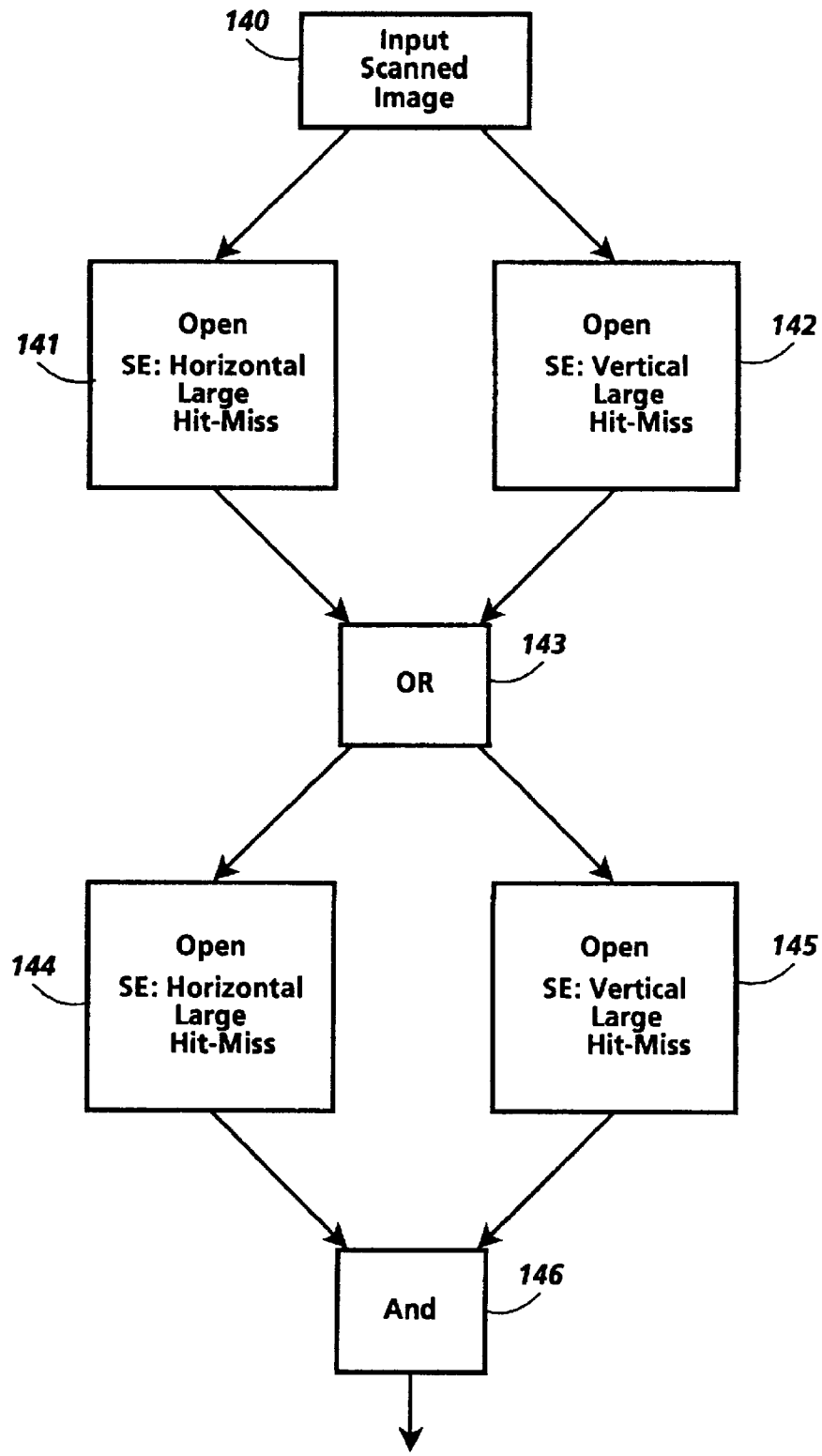
FIG. 11 is a functional block diagram of a morphological filtering process for filtering a scanned-in bitmap image of a glyph code to isolate the ON pixels at or near the centers of the glyphs through the use of large filters which are configured in accordance with the periodicity of the glyph code image.
Figure 12:
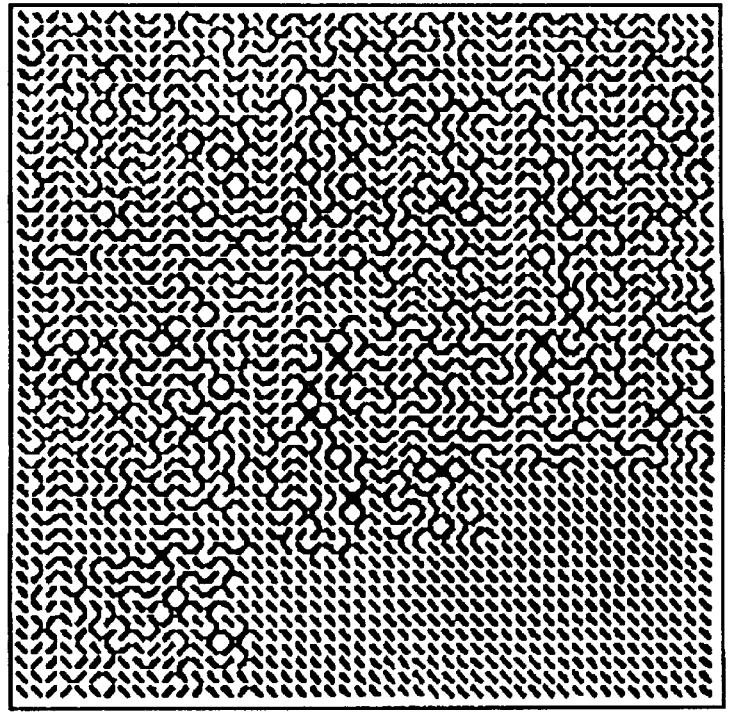
FIG. 12 is a bitmap image of a typical glyph code.
Figure 13:
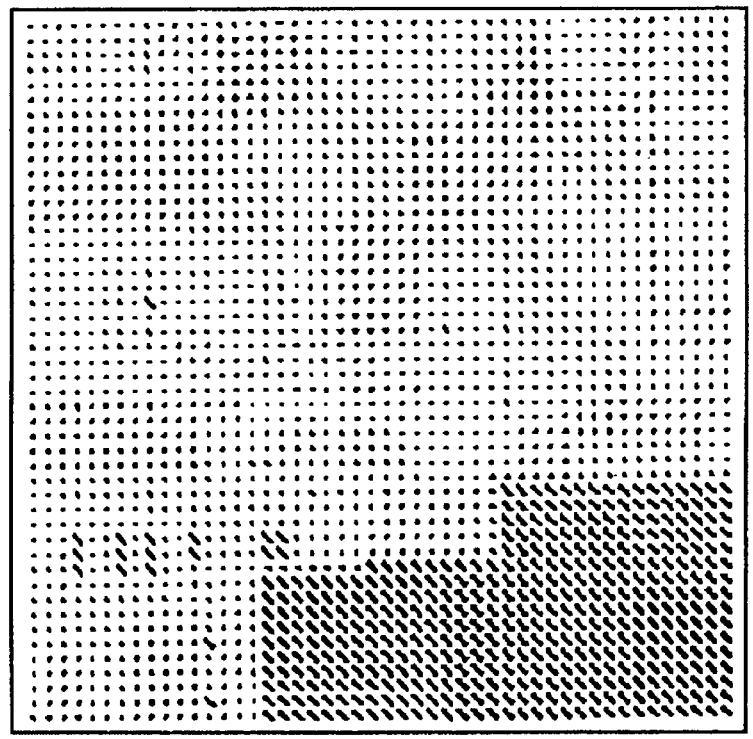
FIG. 13 is a bitmap image illustrating the effect of applying the filtering process shown in FIG. 11 to the bitmap image shown in FIG. 12.
Figure 14:
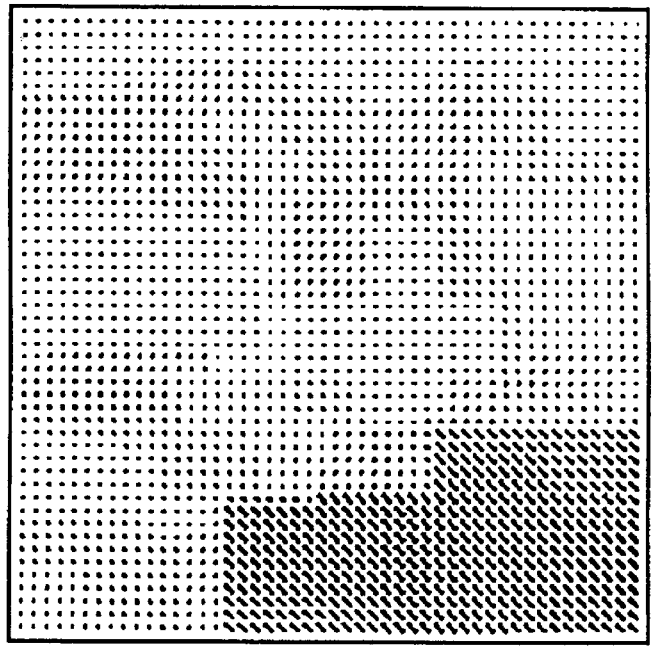
FIG. 14 is another bitmap image to illustrate the effect of iteratively reapplying the second level filtering of the filtering process of FIG. 11 to the bitmap image shown in FIG. 13.
Figure 15:
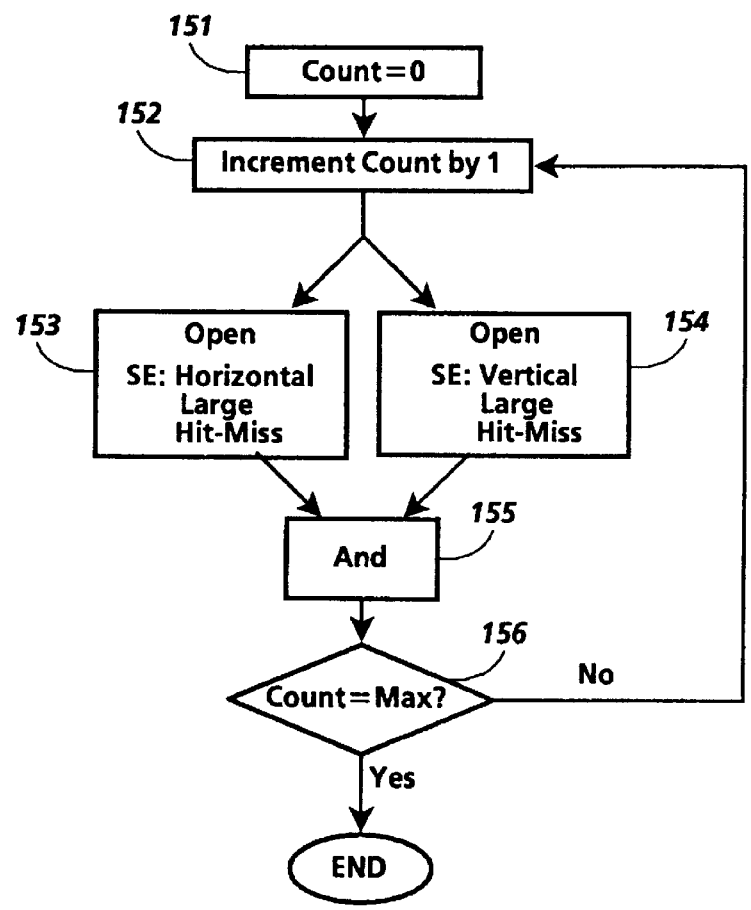
FIG. 15 is a functional block diagram of an iterative second level filtering process.

Turning first to the large filter implementations of the transformation 63, it will be understood that the glyphs of lower density glyph codes (i.e., these that are printed with densities of up to about 2500 glyphs/in$^2$ using glyph cells as small as 6 pels×6 pels) usually are reasonably well separated in the scanned-in bitmap image of the glyph code. Therefore, as shown in FIG. 11, their apparent center pixels generally can be identified with sufficient precision by OPENING the scanned-in bitmap image 140 (see FIG. 12) in accordance with a large horizontal hit-miss filter, as at 141, and a large vertical hit-miss filter, as at 142. The results of these OPENING operations are bit-ORed at 143 to construct a first level filtered bitmap image having relatively little diagonal ON pixel structure. Next, the filtered bitmap image is OPENED at 144 and 145 in accordance with the horizontal and the vertical hit-miss filters, respectively, and the results of these operations are bit-ANDed, as at 146, to provide a second level filtered bitmap image having even less diagonal structure and less vertical and horizontal structure. See FIG. 13. If it is desired to further reduce the ON pixel structure of the second level filtered image (see FIG. 14) one or more additional iterations of the second level filtering process may be employed as shown in FIG. 15 at 151–156.

Figure 19:
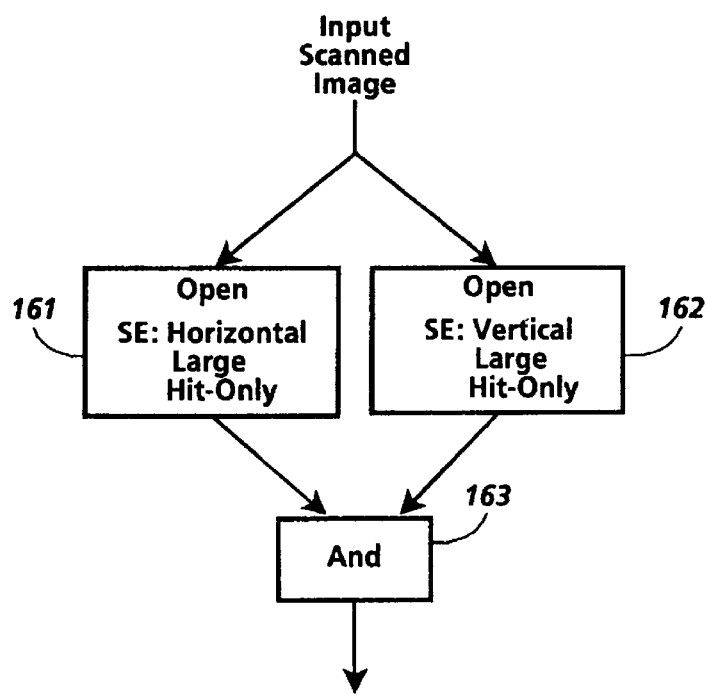
FIG. 19 is a functional block diagram of a preliminary morphological filtering process that utilizes large filters for increasing the spatial separation of the glyphs of higher spatial density glyph codes.

As shown in FIG. 19, for locating the glyph center pixels of higher density glyphs (i.e., densities up to 3600 glyphs/in$^2$ using glyph cells as small as 5 pels×5 pels), the bitmap image of the glyph code suitably is OPENED at 161 and 162 in accordance with large horizontal and vertical hit-only filters, respectively, and the results of those processes are then bit-ANDed at 163 to construct a bitmap image composed of better separated marks.

Figure 20:
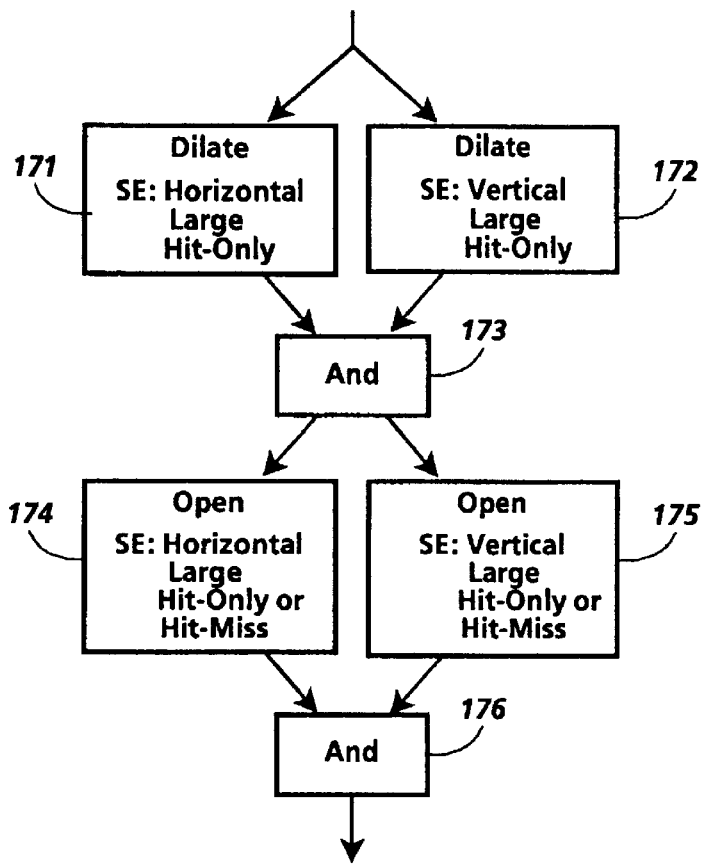
FIG. 20 is a functional block diagram of a morphological bitmap image repair process that may be employed for restoring ON pixels to glyph center locations when the filtering process of FIG. 19 creates holes in the bitmap at those locations.
Figure 21:
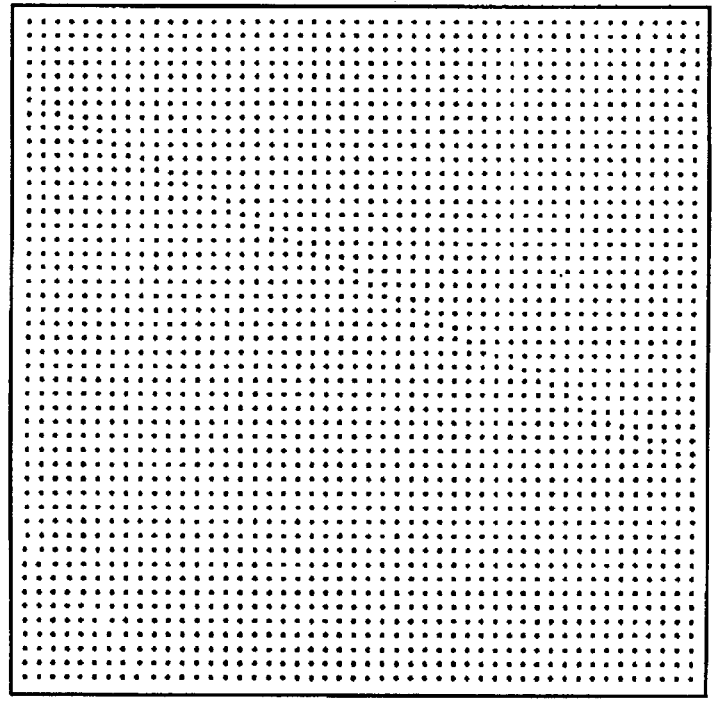
FIG. 21 is a bitmap image of the glyph centers of a relatively high density glyph code, such as may be produced by performing a thinning process on the bitmap shown in FIG. 17 or on a bitmap produced by the image repair process of FIG. 20.

The bit-ANDing 163 of the image OPENING operations 161 and 162 may create some unintended holes at glyph center locations in the resulting bitmap image, but these holes can be filled. To that end, this particular version of the transformation process 63 (FIG. 5) may further include one or more iterations of a fill and repair process. To carry out this fill and repair process, as shown in FIG. 20, the filtered bitmap is first DILATED at 171 and 172 in accordance with large horizontal and vertical hit-only filters, respectively, and the dilated images then are bit-ANDed at 173 to prevent the bitmap image from expanding. That image, in turn, is OPENED at 174 and 175 in accordance with either the large hit-only filter or the large hit-miss filter, and the results of the OPENING operations 174 and 175 then are bit-ANDed at 176.

Figure 22:
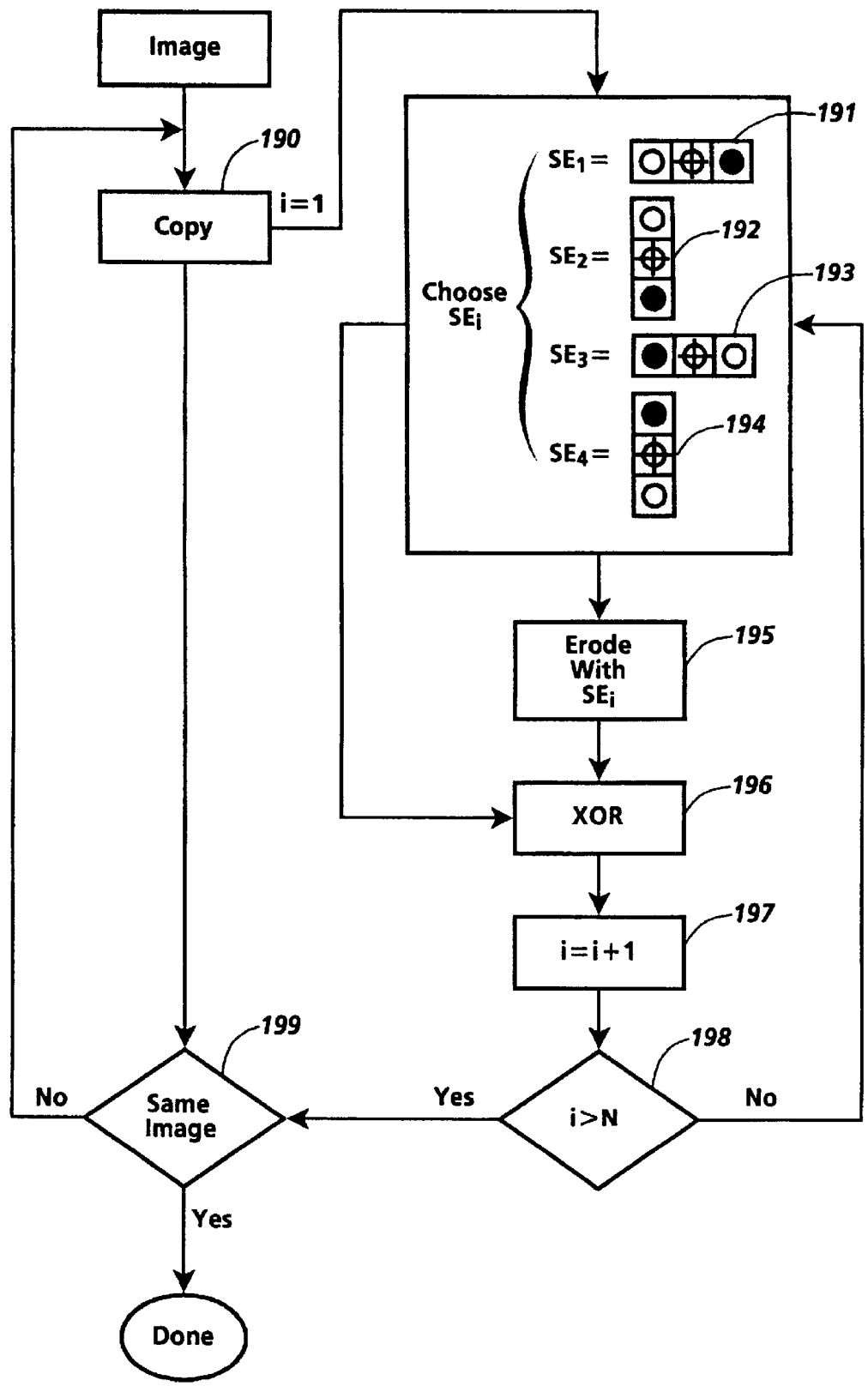
FIG. 22 is a functional block diagram of an iterative morphological thinning process that may be employed for producing the bitmap image shown in FIG. 21.

Upon the completion of the fill and repair process, the bitmap image may have several ON pixels proximate at least some glyph locations. However, the image can be thinned to approximately one pixel per glyph by performing a iterative thinning process on it until thinning stops. As shown in FIG. 22, this thinning process is initiated with a copy of the bitmap image that is to be thinned, as at 190, and with the first of a set of four hit-miss SE's, 191–194, respectively. These hit-miss filters 191–194 specify spatial sequences of two ON pixels and one OFF pixel at angles of 0°, 90°, 180°, and 270°, respectively. During the initial iteration of this thinning process, the bitmap first is ERODED, as at 195, in accordance with the first SE 191, and the ERODED bitmap then is XORed at 196 with the image 190 that is being thinned, whereby a single ON pixel is thinned or "trimmed" from each glyph location that contains a plurality of ON pixels at the orientation of the SE 191, with the pixel that is trimmed being the one that aligns with the center position of the SE 191. Following this initial thinning, an SE index 197 is incremented to repeat the ERODE and XOR steps 195 and 196 on the thinned image, using one after another of the remaining structuring elements 192–194, so that excess ON pixels are trimmed in a predetermined side-to-side order from all horizontally and/or vertically adjacent sets of ON pixels.

After each iteration of the thinning process, as determined at 198, the thinned bitmap image is bit-compared at 199 with the bitmap image 190. If the images are identical, thinning has stopped, so the process is completed. Otherwise, the thinned image is copied at 190, and the process is then repeated in an attempt to further thin the image.

Even higher density glyph codes having spatial densities up to, say, 5625 glyphs/in$^2$ with glyph cells as, say, small as 4 pels×4 pels may be transformed to locate the apparent centers of their glyphs using essentially the same process as described above for the transformation of the medium density codes. However, the transformation of those higher density codes generally requires several iterations of the fill and repair process 171–176 (FIG. 20).

Figure 16:
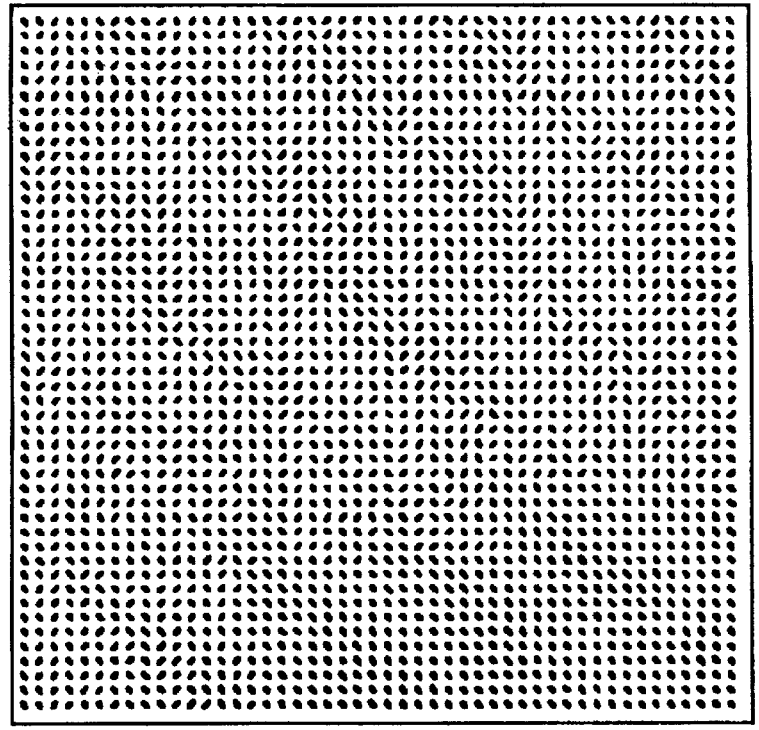
FIG. 16 is a bitmap image of a glyph code filtered by an alternative morphological filtering process for spatially separating the glyph centers.
Figure 23:
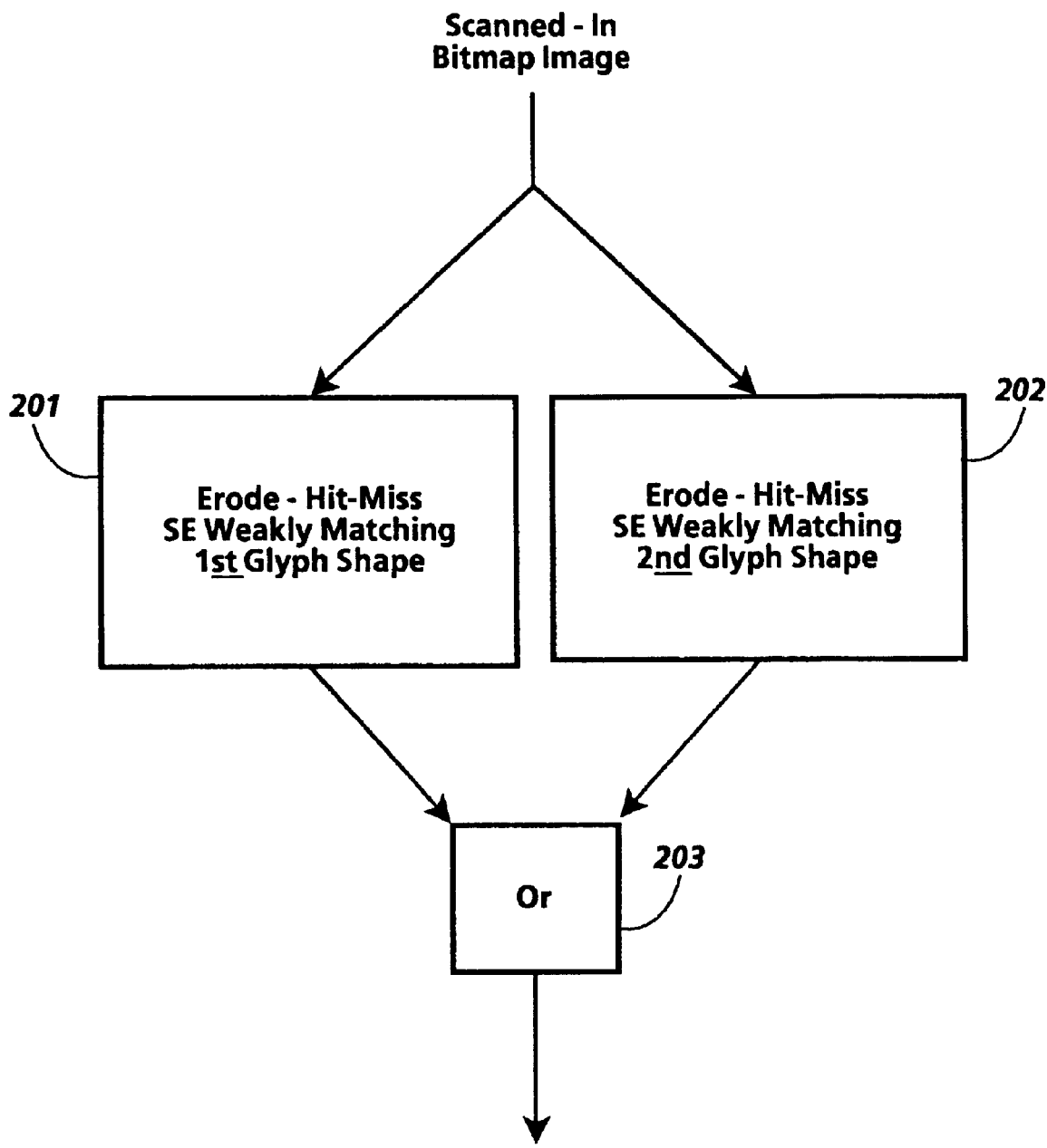
FIG. 23 is a functional block diagram of a morphological process for isolating glyph center pixels through the use of small, weakly matched hit-miss filters.

Alternatively, as pointed out above, the transformation process 63 (FIG. 5) can be performed through the use of small, hit-miss filters that are weakly matched to the permissible glyph shapes. To accomplish that, as shown in FIG. 23, the bitmap image of the glyph code is ERODED, as at 201 and 202, in accordance with small SE's that are weakly matched to respective ones of the permissible glyph shapes, and the results of these EROSIONS then are bit-ORed, as at 203, to construct a filtered bitmap image composed of smaller marks or pixel patterns. For example, when rotationally variant glyphs are employed, the bit-ORing 203 of the results of the EROSIONS 201 and 202 will produce a filtered bitmap composed of smaller, more circular bit or pixel patterns See FIG. 16. This filtered bitmap generally contains several pixels near the center of each glyph.

Figure 17:
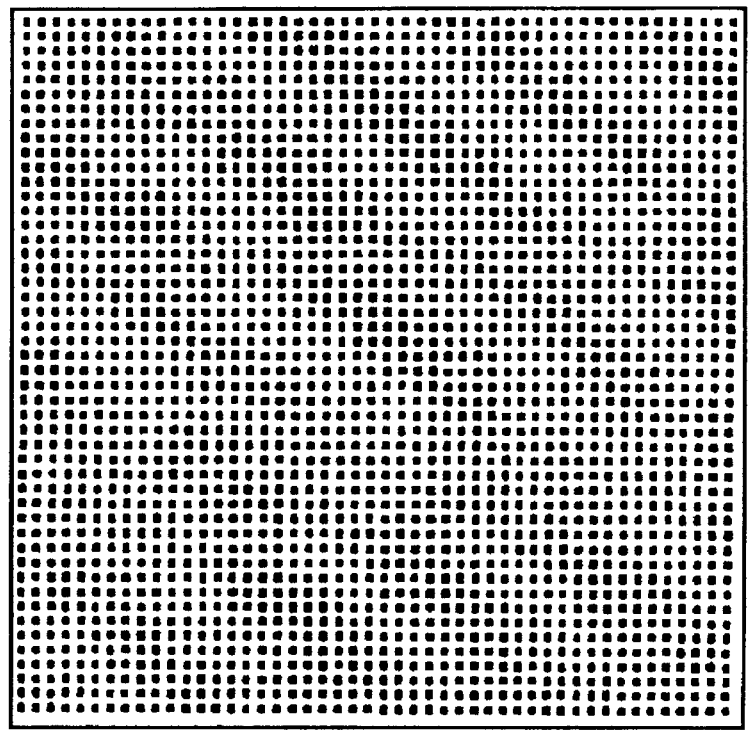
FIG. 17 illustrates a bounding box expansion of the pixel patterns within the bitmap image shown in FIG. 16.
Figure 18:
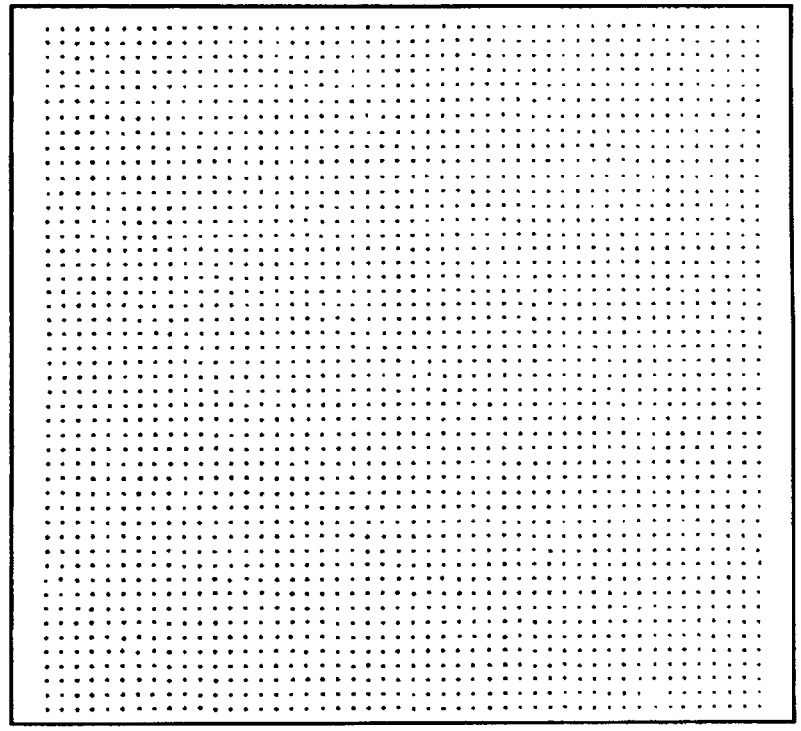
FIG. 18 is a bitmap image showing the isolation of the glyph center pixels that can be achieved, in the case of relatively low spatial density glyph codes, by identifying the centers of gravity of the individual glyph related pixel patterns within the bitmap image shown in FIG. 16 or by performing a thinning process on those patterns or on their bounding box expansions as shown in FIG. 17.

Accordingly, a thinning process of the above-described type (See FIG. 22) usually is needed for thinning the filtered bitmap to approximately one ON pixel per glyph. This thinning process may be preceded by a bounding box expansion of the pixel patterns at the glyph locations to enable the thinning to more precisely isolate the centermost ON pixel of each glyph. See FIG. 17 for an example of a bitmap image produced by such a bounding box expansion.

Also see a copending and commonly assigned U.S. patent application of Dan Bloomberg, which was filed Jul. 31, 1990 under Ser. No. 07/560,659 on "Binary Image Processing for Decoding Selfclocking Glyph Shape and which hereby is incorporated by reference, for a description of a suitable bounding box expansion process.

The thinning of the filtered bitmap (FIG. 16) or of its bounding box expanded counterpart may stop before all of the glyph centers are well defined by a single, isolated ON pixel. In the case of higher spatial density codes, this may cause potentially significant labelling errors to occur during the jump, search and label process 71–73 (FIG. 5), but the optional calibration process 81–83 (FIG. 5) usually is able to recalibrate the glyph center labels with sufficient precision for enabling the glyph shape evaluation phase of the decoding process to track from glyph-to-glyph, as at 107 in FIG. 7,

3. Decoding By Convolution Filtering

Figure 24:
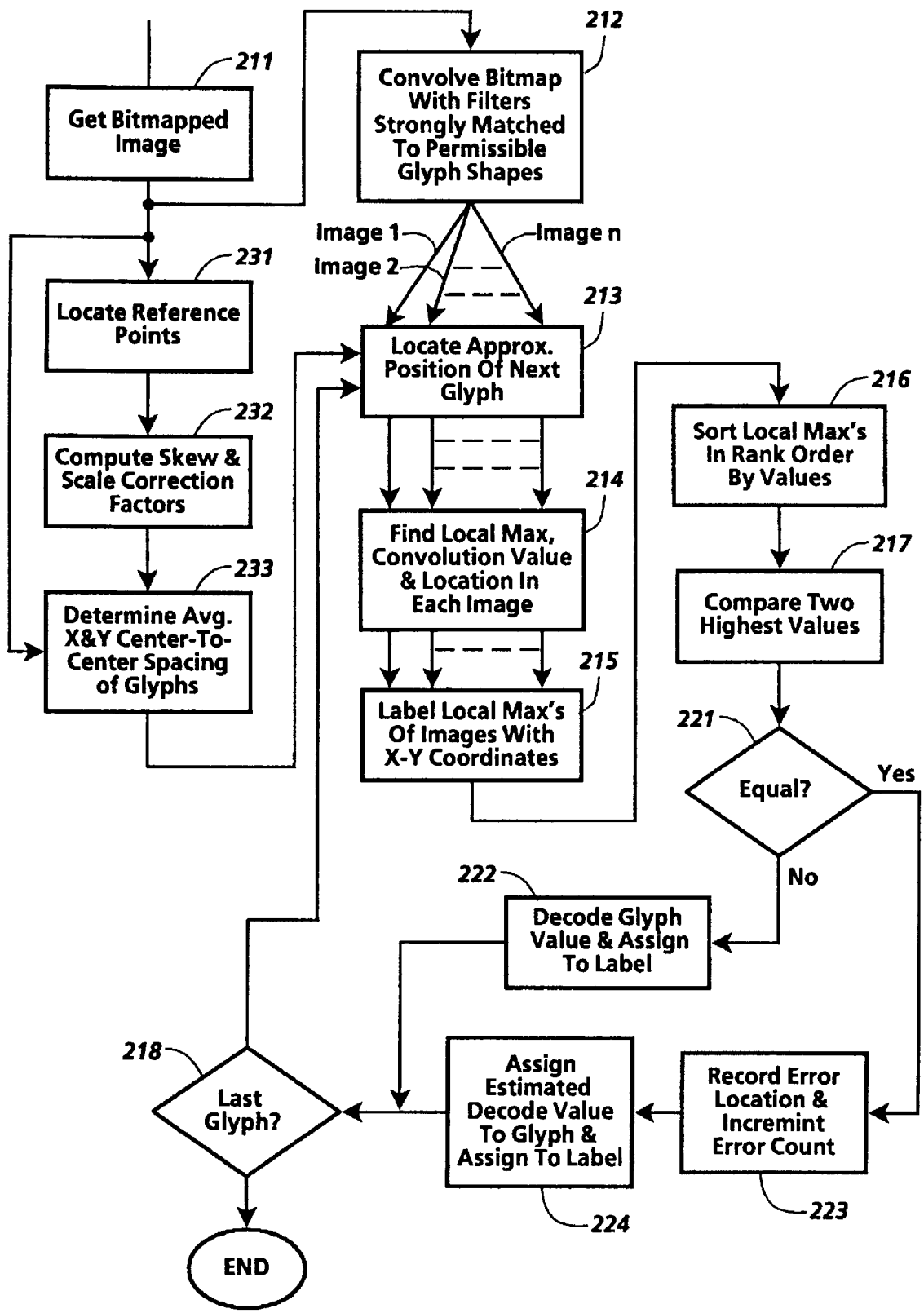
FIG. 24 is a functional flow diagram of a decoding process which utilizes convolution filtering of the bitmap glyph code image for locating the centers of the glyphs in the bitmap image space and for classifying the glyphs in accordance with their shapes.

Turning now to FIG. 24, there is a convolution filtering process for decoding the glyphs of a glyph shape code from a bitmap image of the code, as at 211. As will be seen, this process can be carried out, without having to shrink the glyphs to locate their apparent center pixels in the X-Y image. Instead, the bitmap image 211 is separately convolved at 212 with n different filters, each of which is strongly matched to a corresponding one of the n permissible glyph shapes. The images produced by these convolutions, in turn, are processed glyph-by-glyph, as at 213–218, for identifying their X_Y coordinate locations in the bitmap image space while essentially concurrently classifying them by their shapes for decoding, as at 221–224. Alternatively, the bitmap image could be convolved, data cell-by-data cell, with a set of n matched filters. Furthermore, it will be understood that multiple convolutions could be performed for each permissible glyph shape to furnish an extended set of convolved images for providing additional discrimination between the different glyph shapes.

Figures 25A, 25B, 26:
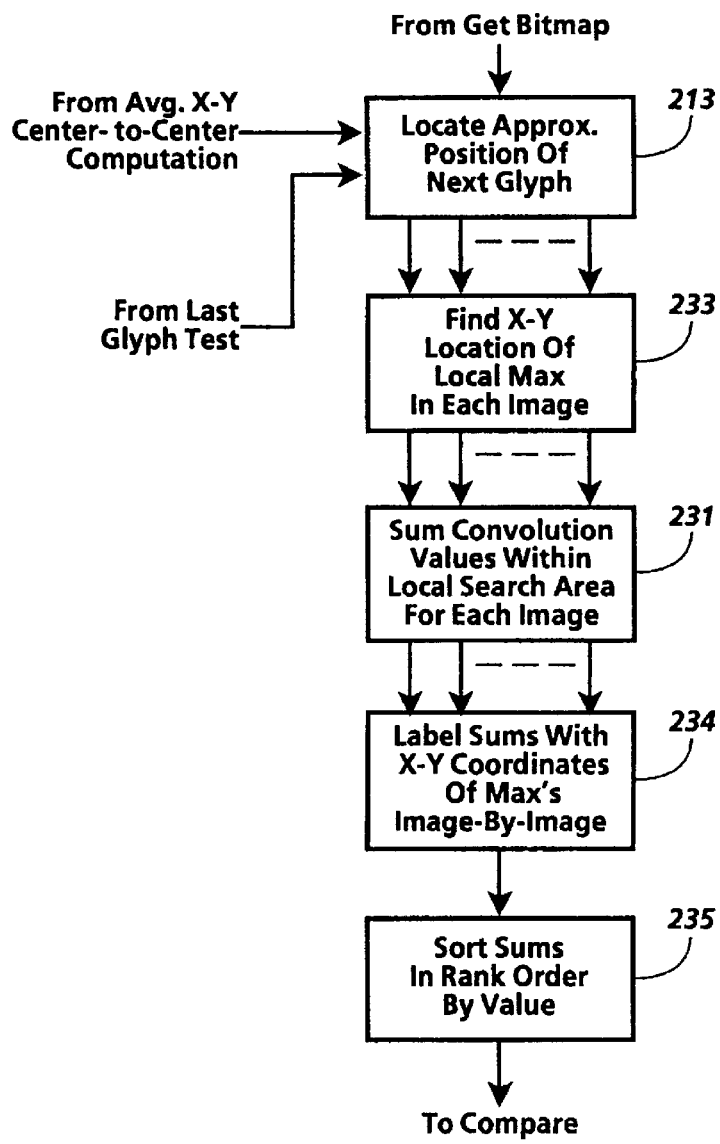
FIGS. 25A and 25B illustrate the results of convolving unweighted and weighted filters, respectively with a glyph shape that is strongly matched by the filters.
FIG. 26 is a fragmentary flow diagram for illustrating a modified embodiment of the decoding process shown in FIG. 24.

As shown in FIGS. 25A and 25B, the convolution filters may be unweighted or weighted, as at 228 and 229, respectively. An unweighted filter is composed of binary positive and negative values, while a weighted filter is composed of positive and/or negative gray-scale values. If weighted filters, such as the filter 229, are used, they advantageously are weighted to emphasize the more distinctive features of the glyph shapes to which they are matched and to de-emphasize the more distinctive features of the other glyph shapes.

More particularly, for decoding a glyph code in accordance with the process shown in FIG. 24, three or more non-colinear reference points of known nominal spatial relationship to one another are located in the glyph code bitmap image space, as at 231, for computing bitmap skew and X and Y scale correction factors, as at 232. The X and Y scale correction factors are employed at 233 for calibrating the average center-to-center displacement of the glyphs along the X-axis and the Y-axis, respectively, of the bitmap image space. The displacement values upon which those calibrations are performed may be computed either from prior knowledge of the spatial density (in printer pels) at which the glyphs were printed or from the spatial periodicity of the bitmap image of the glyph code as determined by a frequency transform, such as a fast Fourier transform or a fast Walsh transform. The skew correction factor, on the other hand, is utilized at 213 for setting the angles of the X and Y displacement vectors that enable the image processing to jump from one glyph position to the likely position of the next glyph in the bitmap image space with sufficient precision to enable the center of the next glyph to be located by performing a search over a relatively small local area. This local search suitably is carried out in accordance with an expanding diamond-like or an expanding square ring-type search pattern. In short, it will be apparent that there are substantial similarities between the preliminary phases of this and the above-described decoding processes. However, it also will be evident that this process requires substantially less preliminary processing of the glyph code bitmap image than those binary decoding processes.

The glyph code is decoded glyph-by-glyph, starting at 213 approximately at the center of, say, the UL corner glyph (suitable processes already have been described for locating that center). To perform the decoding, the bitmap image is convolved at 212 with each of the n glyph matching filters. This produces n gray-scale images, each of which represents the convolved response of the glyph code image to a filter that is relatively strongly matched to a respective one of the n permissible glyph shapes. A local search is conducted at 214 in each of these convolved images, from the approximate or estimated location of the glyph that is being decoded, to label the maximum convolution values the respective images contain for that particular glyph with their X-Y image space coordinates, as at 215. As shown in FIG. 24, these local maximum convolution values are readout from the convolved images at 214 and are indexed by their X-Y bitmap image space coordinates at 215, but it will be seen that the X-Y coordinates of the local maxima may be used in an alternative embodiment for indexing the sums of the convolution values from a small area surrounding those local maxima.

The indexed convolution values (i. e., local maxima or sums) for the n convolved images are sorted in rank order by value at 216, and the two highest values then are compared at 217. If the values are unequal, as determined at 221, the data value for the glyph that is being processed is decoded by reference to the convolution producing the greater value and the X-Y label for that convolution value is assigned to the decoded data value for indexing it in the bitmap image space. See 222. On the other hand, if it is determined at 221 that the two largest convolution values are equal, the X-Y label for a selected one of them is recorded to identify an error location and an error count is incremented, as at 223. Thereafter, as indicated at 224, an estimated decoded data value is provided by reference to the convolution producing the selected convolution value, and the X-Y label or index for the selected convolution value is assigned to the decoded data value for indexing it in the bitmap image space.

The foregoing process is repeated to decode the next glyph if it is determined at 218 that there is another glyph to be decoded. Whenever there is another glyph to be decoded, the decoding process employs the bitmap image space X-Y coordinates (i. e., index location) of a previously decoded neighboring glyph for advancing to the next glyph through the use of the above-described jump and search routine.

Referring to FIG. 26, to increase the noise immunity of this decoding process, each of the local maximum convolution values for the glyph that is being decoded may be summed at 231 with its near neighboring convolution values from a small surrounding area For example, the convolution values may be accumulated, image-by-image, from a small diamond or square shaped area centered on the local maximum for the glyph that is being analyzed in each of the convolved images. The X-Y locations of these local maxima, as determined at 233, then are employed for labelling the sums of the convolution values accumulated from the respective images, as at 234, and the sums then are sorted in rank order by value at 235. From that point on, the decoding process essentially is the same as the previously described version of this type of decoding.

Conclusion

In view of the foregoing, it will now be understood that the present invention provides self-clocking glyph shape codes, including codes that have a pleasing printed appearances and substantial tolerance to image degradation and distortion. It also will be apparent that such codes can be regenerated as desired. Furthermore, it will be evident that such codes can be decoded using a variety of different decoding techniques, including decoding processes that adaptively scale themselves for the decoding of spatially periodic codes of different spatial periodicities.

What is claimed:

1. A method for storing digital values of predetermined bit length, n, in a machine readable format on a hardcopy recording medium, said method comprising the steps of encoding each of said digital values in a corresponding one of $2^n$ physically distinct, distinctive, rotationally variant, substantially equal surface area, individually discriminable glyph shapes to generate a set of mutually independent glyph shapes that vary in accordance with said digital values, and writing said set of glyph shapes on said recording medium in a predetermined logical order and in accordance with a predetermined spatial formatting pattern for storing said digital values in a self-clocking code.

2. The method of claim 1 wherein said digital values are single bit values, and said glyph shapes are elongated along axes that are tilted at angles of approximately plus and minus 45° with respect to a reference axis for distinguishing different ones of said digital values from each other.

3. The method of claim 2 wherein said reference axis extends substantially horizontally with respect to said recording medium.

4. A method for storing digital values of predetermined bit length, n, in a machine readable format on a hardcopy recording medium, said method comprising the steps of encoding each of said digital values in a corresponding one of $2^n$ distinctive, rotationally invariant, substantially equal surface area, individually discriminable glyph shapes to generate a set of mutually independent glyph shapes that vary in accordance with said digital values, and writing said set of glyph shapes on said recording medium in a predetermined logical order and in accordance with a predetermined spatial formatting pattern for storing said digital values in a self-clocking code.

5. The method of any of claims 1–4 wherein said glyph shapes are defined by respective two dimensional pixel arrays of predetermined size, each of which contains a predetermined number of ON pixels and a predetermined number of OFF pixels, and said spatial pattern is spatially periodic.

6. The method of claim 5 wherein said pixel arrays are written on said recording medium in spatially abutting relationship, such that said code has a generally uniform, textured appearance.

7. The method of any of claims 1–4 wherein said glyph shapes are of substantially uniform macroscopic appearance, and said spatial pattern is spatially periodic.

8. The method of claim 7 wherein said glyph shapes are written on said recording medium at a sufficiently high spatial density to impart a generally uniform, textured appearance to said code.

* * * * *